(12) United States Patent
Schönig

(10) Patent No.: US 12,534,263 B2
(45) Date of Patent: Jan. 27, 2026

(54) CAN

(71) Applicant: ENVICAN GMBH, Sennhof (CH)

(72) Inventor: Christoph Schönig, Winterthur (CH)

(73) Assignee: ENVICAN GMBH, Sennhof (CH)

( * ) Notice: Subject to any disclaimer, the term of this patent is extended or adjusted under 35 U.S.C. 154(b) by 91 days.

(21) Appl. No.: 18/287,038

(22) PCT Filed: Apr. 15, 2022

(86) PCT No.: PCT/EP2022/060162
§ 371 (c)(1),
(2) Date: Oct. 16, 2023

(87) PCT Pub. No.: WO2022/219176
PCT Pub. Date: Oct. 20, 2022

(65) Prior Publication Data
US 2024/0217693 A1    Jul. 4, 2024

(30) Foreign Application Priority Data
Apr. 16, 2021    (AT) ............... A 50285/2021

(51) Int. Cl.
*B65D 3/14*    (2006.01)
*B31C 3/02*    (2006.01)
(Continued)

(52) U.S. Cl.
CPC ............ *B65D 3/14* (2013.01); *B31C 3/02* (2013.01); *B31C 3/04* (2013.01); *B65D 3/04* (2013.01); *B65D 3/22* (2013.01)

(58) Field of Classification Search
CPC ... B65D 3/14; B65D 3/04; B65D 3/22; B65D 3/266; B65D 85/08; B32B 2307/7246;
(Continued)

(56) References Cited

U.S. PATENT DOCUMENTS 3,687,351 A    8/1972  Kaercher et al.
3,949,927 A *  4/1976  Smith ..................... B65D 3/18
                                                      229/5.5
(Continued)

FOREIGN PATENT DOCUMENTS

BE          648218 A      9/1964
DE    202007010192 U1    12/2007
(Continued)

OTHER PUBLICATIONS

International Search Report and Written Opinion in International Application No. PCT/EP2022/060162, mailed Aug. 25, 2022, 18 pages.

*Primary Examiner* — Christopher R Demeree
(74) *Attorney, Agent, or Firm* — Liang & Hennessey LLP; Brian Hennessey

(57) ABSTRACT

A can containing a solid, liquid and/or a gaseous medium which can have excess pressure or can develop such during transport or storage. The cylindrical can shell of the can includes paper or cardboard material and at least two wound layers, and is closed at the bottom with a bottom element and at the top with a cover element. The innermost layer of the can shell consisting of a straight-wound barrier layer, which includes a longitudinal seam that runs in the longitudinal direction of the can and is sealed inwards by a film layer, which overlaps the barrier layer near the longitudinal seam, or the longitudinal seam is sealed by a sealing strip running straight in the longitudinal direction or the longitudinal seam forms an increase in thickness and the longitudinal edge of a further layer faces a flank of the increase in thickness.

17 Claims, 18 Drawing Sheets

(51) Int. Cl.
*B31C 3/04* (2006.01)
*B65D 3/04* (2006.01)
*B65D 3/22* (2006.01)

(58) Field of Classification Search
CPC ...... B32B 2307/7265; B32B 2307/732; B32B 2307/75; B32B 2439/66; B32B 2439/70; B32B 1/08; B32B 7/12; B32B 27/10; B32B 27/32; B32B 27/36; B32B 29/005; B32B 2255/26; B31C 3/00; B31C 3/04; B31B 2120/40
USPC ............ 229/4.5, 201, 198.2, 202, 400, 5.84; 220/624, 620; 428/121, 213, 35.9, 36.91; 156/203, 218
See application file for complete search history.

(56) References Cited

U.S. PATENT DOCUMENTS

| | | | |
|---|---|---|---|
| 3,972,467 A * | 8/1976 | Whillock | B32B 27/24 428/479.6 |
| 3,980,107 A * | 9/1976 | Barnes | B32B 15/09 138/143 |
| 4,181,239 A | 1/1980 | Depuydt et al. | |
| 4,286,745 A | 9/1981 | Fukuoka | |
| 4,525,396 A * | 6/1985 | Takasa | B32B 27/304 229/5.8 |
| 4,642,252 A | 2/1987 | Sasaki et al. | |
| 4,766,019 A | 8/1988 | Michaels et al. | |
| 5,476,213 A * | 12/1995 | Suski | B65D 3/14 220/624 |
| 2020/0189791 A1 | 6/2020 | Dregger et al. | |

FOREIGN PATENT DOCUMENTS

| | | |
|---|---|---|
| EP | 0101139 A2 | 2/1984 |
| EP | 0163492 A2 | 12/1985 |
| EP | 2017178 A2 | 1/2009 |
| EP | 2384886 A1 | 11/2011 |
| EP | 3663219 A1 | 6/2020 |
| FR | 2618726 A1 | 2/1989 |
| FR | 2644754 A1 | 9/1990 |
| FR | 2791636 A1 | 10/2000 |
| WO | 9959882 A9 | 8/2000 |
| WO | 2012155890 A1 | 11/2012 |
| WO | 2018224658 A2 | 12/2018 |

* cited by examiner

CAN

CROSS-REFERENCE TO RELATED APPLICATIONS

The present application is a national phase application of PCT Application No. PCT/EP2022/060162, filed Apr. 15, 2022, entitled "CAN", which claims the benefit of Austrian Patent Application No. A50285/2021, filed Apr. 16, 2021, each of which is incorporated by reference in its entirety.

BACKGROUND OF THE INVENTION

1. Field of the Invention

The invention relates to a pressure-resistant can with a can shell made of composite material.

2. Description of the Related Art

A pressure-resistant can is a can for the packaging of media having positive pressure or media that can develop such during storage, transport or use.

In the packaging industry, multi-ply packaging is known having a paper or cardboard packaging wrapper, individual plies of which are wound either straight or obliquely about the longitudinal direction of a mandrel and thus either have joint areas with themselves, extending longitudinally of the packaging shell, or joint areas with themselves, spirally extending around the longitudinal direction of the packaging shell. These packages may have an inner barrier layer, which has a tight folded seam in the joint area of its two edges. Cardboard and paper materials are generally used as the composite material of the layers. Such can shells have hitherto been used for general packaging purposes, for example for packaging powders, such as detergents, cocoa powder, or for snacks, such as crisps, wherein in the case of foodstuffs, the barrier layer protects the foodstuff from the ingress of liquids and gases from the outside, and prevents the escape of liquids and gases from the food or from the interior of the packaging shell.

Meanwhile, there are many composite packages with a can shell made of composite material for food and drinks. However, they reach their limits in the field of compressive strength so that they have not been used for pressurized media, in particular carbonated beverages. Although there are proposals in the patent literature for such can shells made of composite material for carbonated drinks, for example in WO 9959882 A9 and EP 0101139 A2, so far there have been no such products on the market. Perhaps because in the proposed can shells and/or finished cans, the compressive strength could not be achieved sufficiently, or because these proposed can shells and/or finished cans were not competitive with the conventional beverage cans, in particular aluminum cans.

A disadvantage of the packages for carbonated drinks described in WO 9959882 A9 are their special shapes, which on the one hand require their own filling and sealing equipment and on the other hand deviate from the form of a beverage can consumers are familiar with.

A disadvantage of the packages for carbonated drinks described in EP 0101139 A2 are their special shapes, which on the one hand require their own filling and sealing equipment and on the other hand deviate from the form of a beverage can consumers are familiar with, in particular in the region of the bottom and the cover.

From DE202007010192U1 a composite can for carbonated drinks is known, the shell of which mainly consists of paper or cardboard material, wherein the wall thickness is given as 0.5545 mm. A disadvantage of DE202007010192U1 is that the shell consists of a thick sulphate board coated on both sides which overlaps itself, which results in a section which is very widespread in comparison to the rest of the shell. Another disadvantage is that the lateral edge of the inner and outer edge of the laminate is exposed and thus must be additionally sealed, for example by a tape.

In WO2012155890A1 a carbonated beverage package is described having a shell made of composite material, wherein the shell primarily consists of paper or cardboard material. The shell thickness (or layer thickness) of the composite shell of the can is between 0.5 and 0.8 mm, wherein the thickness of the barrier film is from 50 to 120 μm. A disadvantage of WO2012155890A1 is that the entire laminate overlaps itself, resulting in a section that is very widespread in comparison to the rest of the shell. Another disadvantage is that the lateral edge of the inner and outer edge of the laminate is exposed and thus must be additionally sealed, for example by a tape.

From U.S. Pat. No. 3,687,351 A1 a composite can for carbonated drinks is known, the shell of which mainly consists of paper or cardboard material, wherein the shell thickness is about 0.48 mm, which is disadvantageous in that the layer structure comprises a thick aluminum layer having approximately 25 μm layer thickness.

U.S. Pat. No. 4,642,252 describes carbonated beverage packaging with composite shells, wherein the shell may be made largely of paper or cardboard material. The shell thickness of the exemplary embodiment according to FIGS. 1, 8 and 9 is in each case about 900 μm, i.e. 0.9 mm. A disadvantage of U.S. Pat. No. 4,642,252 is that the innermost layer, namely the barrier layer, is wound spirally, which increases the length of its folded seam.

In U.S. Pat. No. 4,766,019 a can for carbonated drinks is proposed which has a shell made of several layers of plastic layers. The shell thickness (or layer thickness) of the shell is given in one exemplary embodiment with 22 mils, i.e. approx. 0.56 mm. It is stated in U.S. Pat. No. 4,766,019 that the shell thickness should be less than 30 mils (0.762 mm) so that the plastic shell can be closed with conventional aluminum covers. The disadvantage is that the shell is made entirely of plastic, which seems less sustainable. The innermost barrier layer in U.S. Pat. No. 4,766,019 is extruded on a mandrel.

U.S. Pat. No. 4,181,239A also shows a can with a plastic shell, wherein it is disadvantageous in that the can shell is constructed entirely of plastic layers. In U.S. Pat. No. 4,181,239A, it is stated that the shell thickness should be between 85 and 770 μm, preferably between 100 and 400 μm.

From the prior art, it is apparent that it has been recognized that the can shell must not exceed a certain thickness so that it can still be closed with standard aluminum can covers of conventional aluminum cans. Secondly, it has apparently been recognized, at least in the can shells of several wound individual layers, that the can shell should not show any large deviations in its layer thickness over the circumference. To achieve this, the innermost layer is designed as a thin plastic film or from a laminate of different plastic films and possibly an aluminum foil, which can be taken from U.S. Pat. Nos. 4,181,239A, 4,766,019 and 4,642,252. In U.S. Pat. No. 4,642,252 it is also provided that the spiral-shaped folded seam of the barrier laminate of plastic films and an aluminum foil is laminated by an intermediate layer of paper.

US2020189791A1 discloses a can containing a liquid and/or a gaseous medium which has positive pressure or develops such during transport or storage, the cylindrical can sleeve of the can mainly consisting of paper or cardboard material and that is closed by a bottom element at the bottom and a lid at the top, the can withstanding an internal pressure of at least 5 bar, the innermost layer of the can sleeve consisting of a straight wound barrier layer which has a folded seam running in the longitudinal direction of the can with itself, the barrier layer being a prefabricated laminate of an inner diffusion-tight barrier film or an inner diffusion-tight barrier laminate and an outer layer of kraft paper.

It has been found to be disadvantageous that, in the case of paper or cardboard composite cans made of wound individual layers, the hold between the individual layers, i.e. the barrier laminate of plastic films and optionally an aluminum foil and the subsequent layers of paper or cardboard material for use as packaging for pressurized media, in particular carbonated beverages, could be insufficient, in particular in the region of the folded seam.

SUMMARY OF THE INVENTION

The invention thus relates to a fluid container, in particular a beverage container, which may also be used for gas emitting canned drinks, such as carbonated mineral waters, sweet drinks, energy drinks or beers, because it is sufficiently resistant to pressure for these purposes as a special feature. Depending on the design, it is suitable for spray cans of all kinds with even higher internal pressures. Moreover, the invention relates to a technical manufacturing and logistics method, which, with the use of such a beverage can, facilitates the beverage filling and in particular the can filling of the containers on site and can produce same as needed, preferably synchronously with an existing filling plant. Preferably, conventional can fillers for the introduction of this new fluid container or beverage container will not have to modify their can filling plants, but can continue to use them seamlessly. Their own production of cans is facilitated, and the space required for this is a small fraction of the space required for the previously indispensable buffer storage of empty aluminum cans for their subsequent filling.

The object of the invention is to further improve a marketable can shell made of composite material for a can for pressurized media, in particular carbonated beverages, which can shell is able to reliably withstand the prevailing or possible internal pressure of such media and mainly consists of paper or cardboard material.

To achieve the object, a can is proposed in an embodiment, containing a solid, liquid and/or a gaseous medium, which may have positive pressure or develop such during transport or storage, wherein the cylindrical can shell of the can mainly consists of paper or cardboard material and comprises at least two wound layers and is closed at the bottom with a bottom element, and with a cover element at the top, wherein the innermost layer of the can shell consists of a straight wound barrier layer, which comprises a longitudinal seam with itself that runs in the longitudinal direction of the can, wherein the barrier layer is sealed by one of the following options:
  the longitudinal seam is sealed on the inside by a film layer of the barrier layer, which simply overlaps the barrier layer in the area of the longitudinal seam, or
  the longitudinal seam is sealed by a sealing strip running straight in the longitudinal direction of the can, or
  the longitudinal seam is a folded seam and the inner or outer longitudinal edge of a further layer of the can shell in the form of a wound layer of paper or cardboard material faces a flank of the increase in thickness resulting from the folded seam.

In order to achieve the object, a can is proposed in a further embodiment, containing a solid, liquid and/or a gaseous medium which can have positive pressure or can develop such pressure during transport or storage, the cylindrical can shell of the can being made mainly of paper or cardboard material, the can shell having a barrier layer on the inside and a barrier layer on the outside and comprising at least two wound middle layers of paper or cardboard material in between and being closed at the bottom with a bottom element and at the top with a cover element, with the innermost layer of the can shell consisting of a straight wound barrier layer which has a longitudinal seam with itself running in the longitudinal direction of the can, with the longitudinal seam forming an increase in thickness in the layer structure, with the inner or outer longitudinal edge of at least one of the middle layers facing a flank of the increase in thickness resulting from the longitudinal seam.

An embodiment provides that the inner longitudinal edge of at least one of the further layers of the can shell faces a flank of the increase in thickness resulting from the longitudinal seam and the outer longitudinal edge of this layer overlaps the inner longitudinal edge of this layer.

An embodiment provides that the inner longitudinal edges of at least two of the other layers of the can shell each face a flank of the increase in thickness resulting from the longitudinal seam and the outer longitudinal edge of the respective layer overlaps the inner longitudinal edge of this layer.

One embodiment provides that the barrier layer is a laminate made of an inner diffusion-tight film or an inner diffusion-tight barrier laminate and an outer layer of cardboard or paper or kraft paper, the barrier layer having a first edge region which overlaps a second edge region of the barrier layer in the area of the longitudinal seam.

One embodiment provides that the barrier layer comprises the inner diffusion-tight film or an inner diffusion-tight barrier laminate and the outer layer of cardboard or paper or kraft paper in the first edge region, with the inner edge of the first edge region being sealed by a sealing strip.

One embodiment provides that the barrier layer in the first edge region or at least in an outer area of the first edge region consist only of the inner diffusion-tight film or the inner diffusion-tight barrier laminate, with the inner diffusion-tight film or the inner diffusion-tight barrier laminate of the first edge region being attached to the inner diffusion-tight film or the inner diffusion-tight barrier laminate of the second edge region.

An embodiment provides that the barrier layer consists only of the cardboard or paper or kraft paper layer in the second edge region or at least in an outer area of the second edge region.

An embodiment provides that the cardboard or paper or kraft paper layer of the barrier layer does not overlap itself.

An embodiment provides that the cardboard or paper or kraft paper layer of the barrier layer overlaps itself.

One embodiment provides that the longitudinal seam of the barrier layer running in the longitudinal direction of the can has an increase in thickness and the inner or outer longitudinal edge of the layer of the can shell, in the form of a wound layer of paper or cardboard material, that follows the barrier layer faces towards a flank of the increase in thickness.

One embodiment provides that the longitudinal seam of the barrier layer running in the longitudinal direction of the can has an increase in thickness and a subsequent layer of the can shell in the form of a wound layer of paper or cardboard material is arranged around the barrier layer, so that the increase in thickness caused by the longitudinal seam is also present in said subsequent layer, with the inner or outer longitudinal edge of the next subsequent layer of the can shell following the subsequent layer, in the form of a wound layer of paper or cardboard material, facing a flank of the increase in thickness.

An embodiment provides that both longitudinal edges of one of the two subsequent layers of the can shell face the two opposite flanks of the increase in thickness.

An embodiment provides that the outer of the two longitudinal edges of at least one of the two subsequent layers of the can shell overlaps the inner of the two longitudinal edges of the same layer.

One embodiment provides that each of the two subsequent layers of the can shall overlaps itself and is present in the overlapping area with itself without a reduction in thickness, with the inner longitudinal edge of the respective layer facing a flank of the increase in thickness.

One embodiment provides that the barrier layer itself consists of one or more film layers and has no cardboard or paper or kraft paper layer, with the barrier layer simply overlapping itself in the area of the longitudinal seam.

One embodiment provides that the barrier layer is a laminate of an inner diffusion-tight film or an inner diffusion-tight barrier laminate and an outer layer of cardboard or paper or kraft paper, with the two edges of the barrier layer meeting in the area of the longitudinal seam to form a butt joint and the area of the butt joint is sealed with a sealing strip.

One embodiment provides that the barrier layer is a laminate of an inner diffusion-tight film or an inner diffusion-tight barrier laminate and an outer layer of cardboard or paper or kraft paper, with either the diffusion-tight film or at least one film layer of the barrier laminate being formed in U-shape around to the inner cut edge of the of cardboard or paper or kraft paper layer or a sealing strip is placed in a U-shape around the inner cut edge of the barrier layer.

In one embodiment, it is proposed that the barrier layer is a laminate of an inner, diffusion-tight film or an inner, diffusion-tight barrier laminate and an outer layer of cardboard or paper, in particular kraft paper, wherein at least one further layer of paper or cardboard material is present around the barrier layer, wherein the cardboard or paper surfaces of the barrier layer and the further wound layer of paper or cardboard material that are lying against one another are adhered, in particular glued, directly to one another.

If the barrier layer is formed as a laminate of film and cardboard or paper, in particular kraft paper, the film is relieved especially in the region of the overlap of the longitudinal seam because the tensile forces are dissipated by the cardboard or paper, in particular kraft paper, wherein due to the straight seam the tensile forces act advantageously in the circumferential direction and no additional forces are introduced in the longitudinal direction of the can, as would be the case with spiral winding of the innermost layer or the barrier layer.

If the innermost layer consists of paper material on the outside and the next layer is made of paper material, these two paper materials can be adhered, in particular glued, to each other directly so that the adhesive can penetrate on both sides into the fibers of the paper material and thus the fibers of one paper layer are bonded by the adhesive directly to the fibers of the other paper layer. An advantage of this is the particularly firm hold, which is not achievable in this way if a barrier layer of plastic is present between the paper materials.

The barrier layer preferably has a layer thickness from 0.060 mm to 0.145 mm. The kraft paper layer of the barrier layer preferably has a layer thickness from 0.065 mm to 0.090 mm. The kraft paper layer of the barrier layer preferably has a tensile strength MD of at least 4.0 kN/m and a tensile strength CD of at least 2 kN/m. Preferably, the diffusion-tight barrier film or the diffusion-tight barrier laminate has a layer thickness from 0.033 mm to 0.055 mm.

Preferably, the barrier laminate comprises an aluminum layer and at least two plastic layers, wherein the aluminum layer is present between two plastic layers.

Preferably, at least two additional cardboard or paper, in particular kraft paper, layers wound separately from one another are placed above the barrier layer.

The can preferably withstands an internal pressure of at least 5 bar.

In a less preferred embodiment the at least two layers of cardboard or paper, in particular kraft paper, do not overlap themselves, or have at least one edge region with reduced thickness in the overlapping region with itself.

Preferably, the respective layer thickness of at least two of the further layers of cardboard or paper, in particular kraft paper, is selected in each case from the range of 140 μm to 175 μm. The respective tensile strength of the kraft papers of the kraft paper layers is preferably at least 10 kN/m (MD) and at least 5 kN/m (CD).

Preferably, the further kraft paper layers and/or further layers of paper or cardboard material are each longitudinally wound. Preferably, their joint or overlap areas are located at different peripheral regions, or the mutually facing joint edges of two layers of cardboard or paper, in particular kraft paper, are preferably offset from one another.

Preferably, the joint or overlap region of the layer of cardboard or paper, in particular kraft paper adjoining the barrier layer is offset relative to the longitudinal seam of the barrier layer.

Preferably, the can has an outer sealing layer applied externally to the layers of cardboard or paper, in particular kraft paper, which outer sealing layer may be present, for example, as a film, laminate, or coated paper. Preferably, the barrier layer, preferably at least two further layers of cardboard or paper, in particular kraft paper, and preferably also the outer sealing layer are processed with a winding system to continuously form a hollow tube, from which individual hollow cylinders are cut off.

Alternatively, the outermost of the at least two layers of cardboard or paper, in particular kraft paper, may already be present as a laminate of a layer of cardboard or paper, in particular kraft paper, and a barrier film before being wound, wherein the barrier film lies on the outside of the composite can shell after the winding has taken place.

The outer barrier film or the outer sealing layer on the outside of the composite can shell may be a semi-permeable film which allows moisture to escape from the can shell but does not allow moisture to enter the can shell from the outside.

The material of the outer barrier film or outer sealing layer on the outside of the composite can shell may be recyclable or renewable PE, biodegradable PE, EVOH or other known barrier materials.

In one alternative embodiment, an outer sealing layer is attached only after the cutting of the individual hollow body. This can be carried out by pulling a tubular sleeve of moisture-tight material on the outside over the individual hollow bodies and securing them to them. Preferably, a shrink tube, formed from a shrink film, is pulled over the cylindrical hollow body and is formed by heat and the associated reduction in diameter onto the can shell. Preferably, the two cut edges of the hollow body are covered by the tubular sleeve so that moisture cannot penetrate into this. The placement of the sleeve or of the shrink tube is advantageously carried out before the two end portions of the individual hollow body are formed to the outside. A gluing or fitting of the sleeve or the shrink tube to the hollow body can be carried out before or during the outward-bending of the end portions of the hollow body. However, the placement or inwards-turning of the sleeve on the hollow body can also take place after the two end portions of the individual hollow body are formed to the outside.

Covering the cut edges of the hollow body with the tubular sleeve includes that the tubular sleeve is wrapped around the cut edges into the interior of the hollow body. The tubular sleeve preferably projects at least 3 mm, in particular at least 4 mm, into the interior of the hollow body at both ends. Advantageously, the tubular sleeve can be welded to the barrier layer or the barrier laminate in their overlapping area inside the hollow body.

The tubular sleeve comprises a plastic film or consists of a plastic film. The plastic film preferably consists of a polyolefin.

The tubular sleeve can be a shrink sleeve or a stretch sleeve.

The paper layer of the hollow body located under the tubular sleeve is preferably printed. The printing can be applied before this paper layer is wound, or it can be applied to the tubular body after it has been wound, either already on the endless tube on the mandrel of the winding machine or after the endless tube has been cut on the individual hollow bodies. However, the printing can also be located on the inside and/or outside of the tubular sleeve.

The tubular sleeve is preferably attached to the almost or completely dried hollow bodies at the end of a transport route of the individual hollow bodies that are cut from the endless tube. The hollow bodies are preferably moved continuously along the transport path. Drying devices can be arranged along the transport route, or the transport route can lead through at least one drying device. Less preferably, the hollow bodies can be temporarily stored until they have dried sufficiently, for example in a drying device.

Thereafter, the tubular sleeve is pulled over one or more hollow bodies in the longitudinal direction, or one or more hollow bodies are pushed into the tubular sleeve in a longitudinal orientation. The tubular sleeve protrudes beyond each can shell at both of its ends, is folded inwards there and glued or preferably welded to the barrier layer (inner liner) of the can shell. The tubular sleeves can be supplied individually or as a continuous tube, in which case the continuous tube is cut after the insertion of one or more can shells at a location following the respective can shell.

After the individual hollow bodies have been cut off, the outer sealing layer can also be applied by coating them or by wrapping them with a film, in which case the two cut edges of the hollow bodies are preferably also covered by the coating or the film.

The application of the outer sealing layer after cutting off the individual hollow bodies is particularly advantageous if, due to the materials used, in particular the glue and its application amount, the layer structure over the two cut edges of the hollow body would not dry sufficiently if the outside of the layer structure is already sealed in the winding system.

As alternative to the outer barrier layer in the form of a film, the outermost of the at least two layers of cardboard or paper, in particular kraft paper, can already be coated on one side with barrier material, for example paint, on the later outer side before winding.

Less preferably, barrier material, such as paint, can be applied to the outside of the hollow tube or the separated hollow cylinder after production.

For example, an aqueous polymer coating or a UV paint can be used as the paint.

Preferably, the cut edges of the individual hollow cylinders, on which the paper material of the layers of cardboard or paper, in particular kraft paper, is exposed, are sealed, for example by applying a tape or a film or by coating with a barrier material, such as paint, waterproof glue, or liquid plastic. Particularly preferably, the cut edges are sealed by impregnation, i.e. by applying a liquid which penetrates or is sucked somewhat into the fiber matrix of the layer of cardboard or paper, in particular kraft paper, at the cut edges and thus forms a liquid-resistant edge region in the cardboard or paper, in particular kraft paper. Such an impregnation may also be used if the outermost layer of the can has one (in the case of overlapping) or two (in the case of a butt joint seam) exposed longitudinal absorbent edges.

For impregnation, a polymer mixture in aqueous solution or as an aqueous emulsion is preferably used.

Preferably, the cut edges of the individual hollow cylinders are bent outwardly to facilitate the placement of the bottom element and the cover, or to improve the hold of the bottom element and the cover on the hollow cylinder.

In one embodiment, a coating in the liquid or gaseous state of aggregation or as a plasma is applied to the barrier layer. In one embodiment, this coating is applied after winding inside the formed hollow body.

A coating with silicon oxide (SiOx) is particularly preferred. The coating, in particular with SiOx, is particularly advantageous in those embodiments in which the barrier layer does not form a folded seam with itself, that is, for example, has a simple overlap or a butt joint with itself.

Instead of or in addition to silicon oxide (SiOx), the barrier layer can also include another oxide layer, in particular another semi-metal oxide layer or a metal oxide layer.

In a preferred embodiment a coating takes place that consists of or contains nanocellulose, in particular microfibrillated cellulose (MFC). The cardboard or paper material, in particular kraft paper material, of the barrier layer preferably contains nanocellulose, in particular microfibrillated cellulose (MFC). Nanocellulose, in particular microfibrillated cellulose (MFC), can be used in the present invention as a film, in plastic films or in paper materials (therefore also in the other layers of cardboard or paper, in particular kraft paper material) in order to increase the barrier properties and/or strength.

With the present invention, it is preferably achieved that the can shells can be closed with standard covers of aluminum cans and filling and closing the cans in standard filling of aluminum cans is also possible because the can shell does not exceed the necessary maximum layer thickness and in the region of the longitudinal seam, the barrier layer still has permissible deviation of the shell thickness.

Advantageously, for the production of the hollow cylinder, known winding mandrel systems may be used with the use of a round winding mandrel when the individual layers of the can shell according to the invention are fed laid around the mandrel and preferably glued together over the entire surface, so for the production of the can shell according to the invention, continuously operating standard plants can be used with little adaptation effort. A round structure of the can according to the invention is required so that it can be closed with standard can covers and a cylindrical body is more resistant to pressure than another shape, for example, an approximately rectangular body with rounded corners, which is quite common for the general packaging purpose.

Advantageously, by the construction of the composite can shell according to the invention, a pressure-tight container can be produced at a plant, which was previously used for the packaging of conventional consumer goods. Surprisingly, it has been shown that by using a barrier layer made layer of cardboard or paper, in particular kraft paper and a barrier film or a barrier laminate in the preferred thickness range of the invention, the operating speed of the known plant can be advantageously increased since an elongation of the barrier film or the barrier laminate is prevented at the mandrel, which turns out much stronger with straight winding than with spiral winding.

Instead of wrapping the at least two further layers of cardboard or paper, in particular kraft paper in the same way as the barrier layer in the longitudinal direction of the mandrel, the at least two further kraft paper layers could also be wound obliquely around the straight wound barrier layer, wherein the displacement areas and the chamfering or grading of the edge areas of the kraft paper may take place. The oblique winding of the at least two further kraft paper layers may take place for each layer in the same direction, or against each other. However, this variant with the obliquely wound further kraft paper layers has the disadvantage that the joint areas or overlap areas of the kraft paper layers intersect the longitudinal seam of the barrier layer, as a result of which weak points can result at these locations. In the case of the opposite winding, the joint areas or overlapping areas of the at least two kraft paper layers also intersect so that weak spots can also result there.

Preferably, therefore, the at least two further layers of cardboard or paper, in particular kraft paper are also wound straight.

A less preferred or advantageous possible modification emanating from the present invention could be provided in that instead layers of cardboard or paper, in particular kraft paper it uses paper or kraft paper webs laminated with plastic (esp. PE) on one side or both sides and the connection of the layers together is made by adjacent plastic layers of two layers welded together. Accordingly, at least one layer would have an outer PE film and at least one further layer would have an inner PE film, which are welded together when the layers are applied, in particular on the mandrel in a winding machine, in particular by ultrasonic welding. Of course, all layers could be fixed with plastic-plastic (PE-PE) welding together. In order to arrive at this alternative embodiment, it is theoretically possible to replace the glue with plastic films in at least one or all parts of this description in which glue for bonding two surfaces is mentioned, therefore surfaces to be glued are welded together instead. PE-PE welding is common in the manufacture of beverage cartons, wherein beverage cartons have the disadvantage that they are not suitable for carbonated drinks or for media having or developing strong positive pressure. The layer structure of a beverage carton (barrier layer (PE or PE-Alu-PE)-paper-plastic layer (PE)) could theoretically be used as the innermost layer of a can having a longitudinal seam (simple overlap with internal strip as usual in beverage cartons, or folded seam) in order to wind over it at least one further layer with an inner plastic layer (PE) and an outer cardboard or paper layer, wherein the outermost layer of the layer structure has an outer barrier layer, for example made of PE. Unlike customary beverage cartons, however, the layer structure would be in cylindrical form and closed with suitable closure elements (can bottom and can cover) instead of welding the layer structure to itself at the ends.

DETAILED DESCRIPTION

Figure 1:
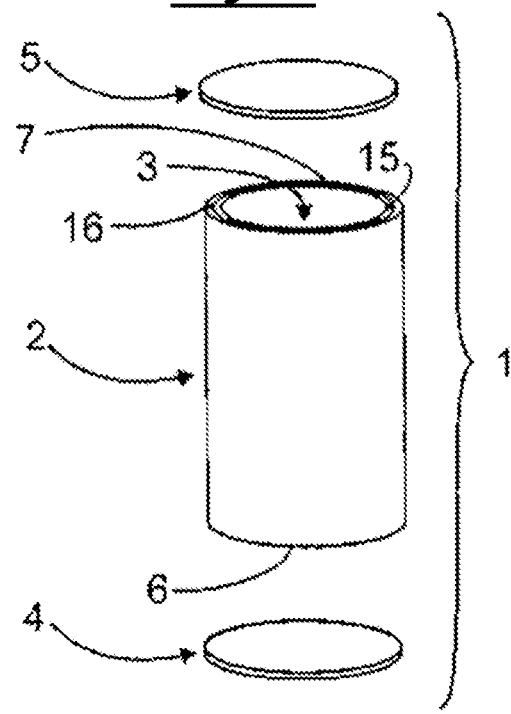
FIG. 1 shows an exploded view of the fluid container according to the invention in the form of a beverage can according to a first embodiment.

Before discussing the individual figures, the fluid container according to the invention should be described in general terms: The fluid container, in particular in its design as a beverage can, is designed as a pressurized container and for this purpose has a hollow cylindrical can body comprising an interior for receiving a beverage, a bottom member and a cover member, wherein the bottom member closes a first longitudinal end of the hollow cylindrical can body formed and the cover member closes a second longitudinal end of the hollow cylindrical can body. The can body comprises at least one wound inner material layer and one wound outer material layer, i.e. at least two wraps or layers of cardboard composite or kraft paper, wherein the layers either extend exactly 360° or, in another embodiment, extend slightly more than an entire wrap. Combinations of layers with exactly one wrap length and those with a little more are possible. These layers are preferably wound at right angles to the axis of the can body to be produced, resulting in a maximum compressive strength, since then the necessary overlaps and thus the seams have a minimum length. Helical windings in which the longitudinal edges of the wound bands are joined together to form tight overlaps and seams, however, require longer seams. Such windings are also referred to as helical windings and they are found so far on cylindrical table bombs or containers for stacked crisps or as a container for all sorts of other suitable goods. The wound inner material layer of the pressure-resistant and preferably also heat-resistant can according to the invention has an axially extending inner seam and is formed by a cardboard composite material or kraft paper layer, which is coated, preferably only on one side, on the side surface facing the can interior with a gas and aroma-tight barrier composite, and the wound outer material layer has an outer seam and is preferably formed by a kraft paper layer, wherein the seam formed by the overlap is preferably offset relative to that of the inner material layer with respect to the circumference of the can. In the presence of a third layer of cardboard composite material, the overlap or seam of which is preferably staggered relative to the seam of the then central layer again with respect to the circumference of the can.

With this fluid container, a beverage container or a cylindrical beverage can is provided in a structurally simple manner and cost, which is characterized by a simple structure and by the use of recyclable materials. Such a beverage can may surprisingly be designed and manufactured to be sufficiently pressure resistant, in particular by consisting of several layers and wraps, so that it can be used for carbonated drinks as well as for non-carbonated drinks and may withstand pressures of up to 11 bar, although it is mainly produced from bare cardboard composite material. Except for a minimal internal coating or barrier layer, the shell consists mainly of cardboard material or kraft paper. This beverage can is food safe. The can body according to the invention consists of cardboard or even paper, namely a kraft paper, and no longer of aluminum. By sealing the inner material layer with the aid of a barrier composite, a perfectly vapor-, aroma-, fat- and oxygen-tight barrier results. This barrier composite is applied, for example, by means of a hot casting method by an extruder. The material used for the barrier composite is a polyolefin layer and at least one layer of a bonding agent. If necessary, a layer of aluminum may additionally be used, in which case the total surface weight of this innermost layer may be approx. 60 $g/m^2$ to 130 $g/m^2$. In a further alternative, the barrier composite may additionally comprise a layer of ethylene-vinyl alcohol copolymer, whereby a total surface weight of 50 $g/m^2$ to 100 $g/m^2$ can be achieved.

The kraft paper layer of the outer material layer is preferably coated on one side with a polyolefin layer, on the side facing away from the can interior. This polyolefin layer has a grammage of at least 10 $g/m^2$ and at most 50 $g/m^2$ and consists of polyethylene PE or polyethylene terephthalate PET. The ideal grammage has been found to be 20 $g/m^2$. In this case, the advantageous barrier effect of polyethylene terephthalate PET can be used. This beverage can therefore make an important contribution to the protection of the environment and the reduction of waste.

In view of the fact that the beverage can serves as a packaging and accordingly there is a desire to label the contents on the outside, the kraft paper layer of the outer material layer is formed on one side on the outer side facing away from the can interior to be printable or paintable in a waterproof manner. Thus, external surfaces are available on which advertising messages can be printed or painted. The wound inner material layer and the wound outer material layer are preferably glued together over the entire surface. In this way, it is ensured that the seams remain relatively offset with respect to the circumference of the can and the compressive strength is increased.

In order to increase the stability of this fluid container or beverage can in an environmentally friendly manner, a triple wrapping is advantageously produced by at least one wound intermediate material layer applied between the wound inner material layer and the wound outer material layer, which is also formed by a kraft paper layer, wherein the inner material layer, the at least one intermediate material layer and the outer material layer are glued together on the opposing kraft paper layers over the entire surface. The at least one wound intermediate material layer has an intermediate seam, which is preferably offset relative to the inner seam and the outer seam with respect to the circumference of the winding. The staggered arrangement of inner seam, intermediate seam and outer seam proves to be particularly advantageous in terms of tightness and pressure resistance for filling with carbonated drinks.

Particularly advantageous is a barrier composite of the innermost layer of a polyolefin layer with at least one layer of an adhesion promoter. To increase the mechanical stability of the inner material layer when it comes to achieving a particularly high compressive strength, for pressures of 11 bar and more, the barrier composite may additionally comprise a layer of aluminum and a total grammage of at least 60 $g/m^2$ and at most 130 $g/m^2$. By choosing the material, however, the weight of the fluid container increases only insignificantly, whereas the inner material layer gains toughness through a suitable choice of material.

Alternatively, to increase the mechanical stability for the barrier composite, instead of a single layer of aluminum, a layer of ethylene-vinyl alcohol copolymer may additionally be employed, and the total grammage is then at least 50 $g/m^2$ and at most 100 $g/m^2$. Ethylene-vinyl alcohol copolymer also has the properties necessary to form a barrier. In a further alternative embodiment with increased mechanical stability, additionally a layer of polyvinyl alcohol, having a total grammage of at least 50 $g/m^2$ and at most 100 $g/m^2$ can be used as a barrier composite. In this case, polyvinyl alcohol has a high tensile strength and flexibility.

In view of a low total weight of the fluid container, a kraft paper layer having a grammage of at least 60 $g/m^2$ and of at most 180 $g/m^2$ is suitable. The bottom element and/or the cover element can be produced for a good pressure resistance of the metal can, preferably made of aluminum, as conventionally.

In the following, the individual figures are described and explained in detail. In FIG. 1, a fluid container according to the invention in the form of a beverage can 1 is shown in a schematic single part illustration. The beverage can 1 comprises a pipe section or a hollow cylindrical can body 2 with a can interior 3 serving to receive the beverage, as well as a bottom element 4 and a cover element 5. The bottom element 4 serves to close a first longitudinal end 6 of the can body 2, wherein the cover element 5 is provided to close a second longitudinal end 7 of the can body 2. The bottom element 4 and the cover element 5 are preferably made of metal, preferably aluminum. Said beverage can 1 may have a height from 100 mm to 250 mm with a diameter from 35 mm to 600 mm, wherein a height from 100 mm with a diameter from 45 mm to 70 mm is preferred.

Figure 2:
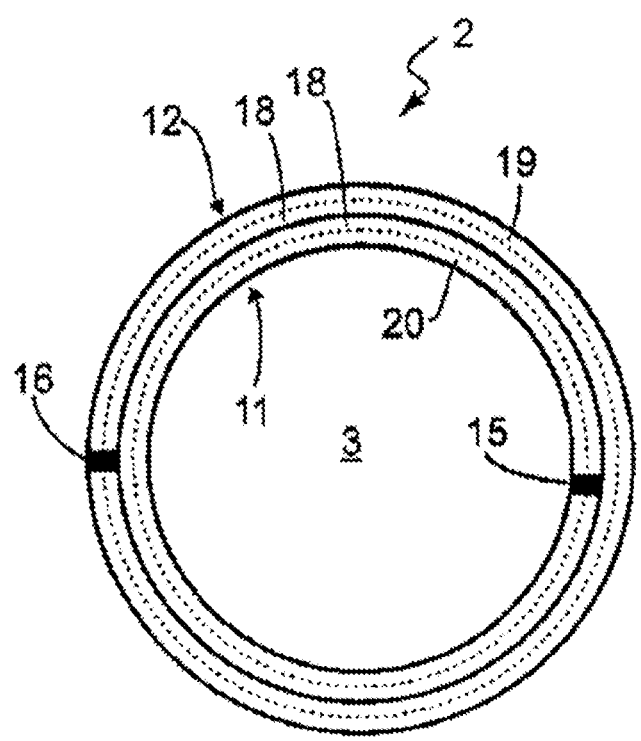
FIG. 2 shows a schematic sectional view through a beverage can from FIG. 1 made of two layers shown greatly enlarged.

FIG. 2 shows a first variant with a two-layered can body in a cross section, with layers shown greatly enlarged, in principle. A first kraft paper layer 18 with an in-line polyolefin layer as a barrier composite is wound around inner layer 11 around a central cylindrical steel mandrel, and with a first seam 15, the winding-direction edges are glued or welded. A second kraft paper layer 18 is subsequently wound as an outer material layer 12 onto the first layer 11, in such a way that the edges lying in the winding direction are welded or glued to the seam 16 on a side of the can body 2 opposite the seam 15 so that a can body 2 with a hollow can interior 3 is created.

Figure 3:
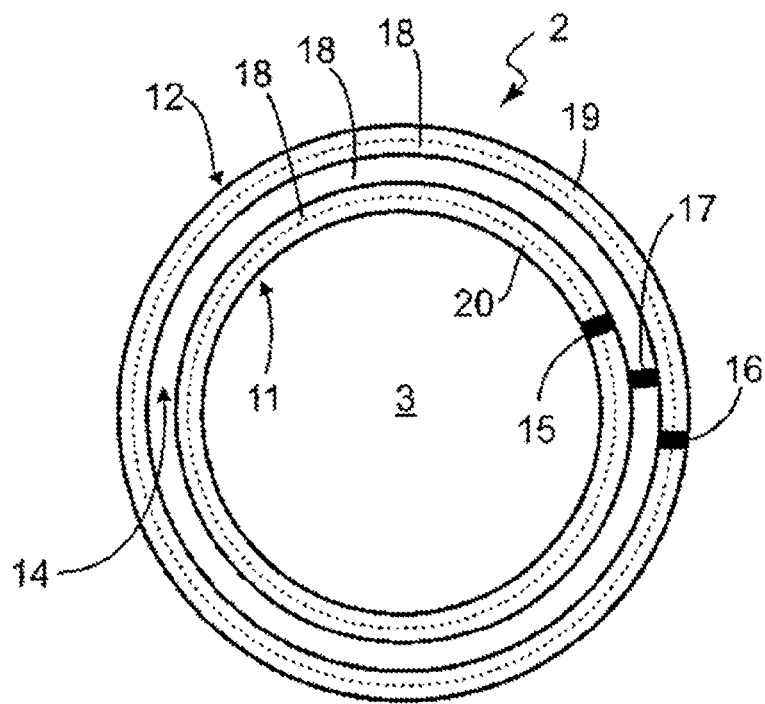
FIG. 3 shows a schematic sectional view through a beverage can according to a second, three-layer embodiment with greatly enlarged layers shown.

In FIG. 3, a second embodiment of the beverage container 1 is shown in a cross section through the can body 2 so that it can be seen that this second embodiment of the first embodiment of FIG. 2 differs in that the structure of the can body 2 in this second embodiment has three layers of material 11, 14, 12, instead of only two layers. The following description applies to both embodiments, with the differences between the two embodiments being addressed.

In both embodiments, which are illustrated in FIGS. 2 and 3, the can body 2 comprises a wound inner material layer 11 and a wound outer material layer 12. In the second embodiment according to FIG. 3, a further material layer is present, namely a wound intermediate material layer 14, which is arranged between the inner material layer 11 and the outer material layer 12. It is also possible for more than one intermediate material layer 14 to be arranged between the inner material layer 11 and the outer material layer 12, wherein it has been shown that three intermediate material layers 14 represent a kind of maximum and a further increase in the number of intermediate layers is not necessary for increasing the stability.

The inner material layer 11, the outer material layer 12 and, in the second embodiment, the intermediate material layer 14 are unwound from material web rolls. Then, preferably in a machine, their edge regions are ground so that they form either an inclined surface or a step so that the later overlapping edge regions are not thicker than those of the cardboard composite material layer itself. After that, the material webs are wound transversely to their course direction and at right angles to the can body 2 around a mandrel 23, for the production of the can body 2 and the later closed can 1. The then overlapping edge regions of the individual material layers are connected to one another in a form-fitting manner by gluing. Consequently, the wound inner material layer 11 has an inner seam 15 and the outer material layer 12 has an outer seam 16. Accordingly, in the second embodiment, the intermediate material layer 14 has an intermediate seam 17.

For the function and aesthetics of the fluid container, in particular also a beverage can, it is advantageous if the individual seams 15, 16 and optionally 17 are not arranged on identical circumferential positions, as shown in FIG. 3, but that the inner seam 15, the outer seam 16 in the first embodiment of FIG. 2 and in the second embodiment of FIG. 3, the intermediate seam 17 are additionally arranged at different circumferential positions after the material layers 11, 12 and optionally 14 are glued together. Whether the inner seam 15 is arranged offset by 180° to the outer seam 16, as shown in FIG. 2, or whether the seams 15, 16 and 17 are offset by only approx. 15° to each other, as shown in FIG. 3, does not matter as much. It is advantageous that the seams 15, 16 and optionally 17 are arranged relatively offset from one another and are not located on the same circumferential position of the can body 2.

As the base material, the inner material layer 11 and the outer material layer 12 are each formed by a kraft paper layer 18, wherein—if present—the intermediate material layer 14 is formed by a kraft paper layer 18. In this case, a respective kraft paper layer 18 preferably has a grammage of at least 40 g/m$^2$ and of at most 180 g/m$^2$, wherein a grammage of at least 80 g/m$^2$ and of at most 120 g/m$^2$ is preferred. As an alternative base material, a sack paper with a high tensile strength is also considered.

In both embodiments, according to FIGS. 2 and 3, the kraft paper layer 18 of the outer material layer 12 is coated on one side on the outer side surface facing away from the can interior 3 with a polyolefin layer 19 as a barrier composite. This two-layer structure of the outer material layer 12 is schematically indicated by the dashed line, wherein the representation of FIGS. 2 and 3 do not reflect the real layer thicknesses. The polyolefin layer 19 preferably has a grammage of at least 10 g/m$^2$ and at most 40 g/m$^2$, wherein a grammage of 20 g/m$^2$ is preferred. In addition, the polyolefin layer 19 may be equipped with or without semi-permeable properties. As an alternative to the polyolefin layer 19 (not shown) the kraft paper layer 18 of the outer material layer 12 may be printed or painted on one side on the outer side surface facing away from the can interior 3.

Furthermore, in both embodiments, according to FIGS. 2 and 3, the inner material layer 11 is coated on one side with a gas-tight and aroma-tight barrier composite 20 on the side surface facing the can interior 3. Again, the two-layer structure is schematically indicated by the dashed line in the respective figures. The barrier composite 20 itself can be multi-layered.

The inner material layer 11 can be coated on one side on the side surface facing the can interior 3 with a gas and aroma-tight layer. Here, too, the two-layer structure is indicated schematically by the dashed line in the respective figures. The layer is preferably sprayed on, printed on or applied by coating such as plasma coating. The layer particularly preferably comprises an inorganic barrier material. The layer particularly preferably comprises a non-metallic, inorganic barrier material.

The layer particularly preferably comprises silicon oxide (SiOx) as a barrier material. The layer is preferably applied directly to the paper material of the inner material layer 11. The paper material of the inner material layer 11 can be provided with a thin plastic layer, preferably in the form of a primer, before the SiOx coating is applied. Alternatively, the inner material layer 11 can already be present as a laminate of a cardboard, paper, in particular kraft paper layer and a barrier film, with an additional SiOx layer being present on or in the barrier film. The layer can already be present on the inner material layer before it is wound, or it can have been applied to it before it is wound. The layer can be applied after the inner material layer 11 has been wound, in particular after the entire hollow body has been wound. Plasma coating is particularly suitable for applying the barrier layer made of SiOx.

The layer preferably contains nanocellulose, in particular microfibrillated cellulose (MFC).

The inner material layer 11 preferably contains nanocellulose, in particular microfibrillated cellulose (MFC).

A plastic barrier layer or a barrier composite can comprise a polyolefin layer and at least one layer of a bonding agent. In addition, the barrier composite 20 may then have a layer of aluminum, ethylene-vinyl alcohol copolymer or polyvinyl alcohol. In the case of an additional layer of aluminum, the barrier composite 20 preferably has a total grammage of at least 60 g/m$^2$ and at most 130 g/m$^2$, preferably of 110 g/m$^2$. In the case of an additional layer of ethylene-vinyl alcohol copolymer or of polyvinyl alcohol instead of aluminum, the barrier composite 20 preferably has a total grammage of at least 50 g/m$^2$ and at most 100 g/m$^2$, preferably of 70 g/m$^2$.

Taking the above layer structure into consideration, it can be seen that in the first embodiment according to FIG. 2, the wound inner material layer 11 and the wound outer material layer 12 are glued together over the entire surface on the opposite side surfaces of the respective kraft paper layers 18 preferably. In the second embodiment according to FIG. 3, the inner material layer 11, the intermediate material layer 14 and the outer material layer 12 on the opposing kraft paper layers 18 are glued together over their entire surface preferably.

In summary, this exemplary fluid container described as a beverage can is made primarily of cardboard material and is suitable for both non-carbonated and carbonated drinks. It is a preferably three-piece, linearly manufactured, primarily—for a uniform pressure absorption—cylindrical fluid container, although other forms are theoretically possible, such as the shape of a 5-liter beer keg. The fluid container comprises respectively a can body 2 made of a multi-layer cardboard and barrier cardboard composite and a bottom element 4, preferably made of metal, preferably aluminum, and a cover element 5 preferably made of metal, preferably also aluminum. The cover element 5 is further provided with a known device for opening, preferably a pull-ring, wherein optionally means may be provided which allow re-closing.

Figure 4:
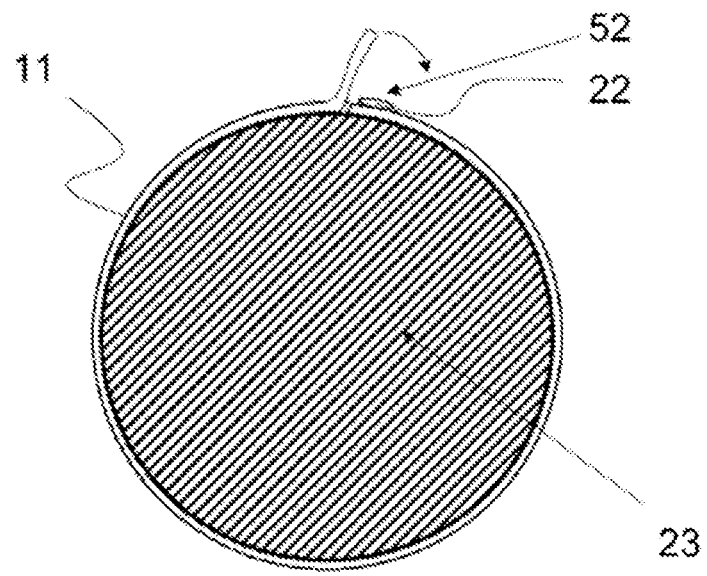
FIG. 4 shows a schematic sectional view through a beverage can with a first layer with a barrier layer on its inside, wherein the two edge regions of the layer overlap the winding, are led to the outside, then are welded together with the barrier layers and then applied by means of glue on the wound layer and become glued.
Figure 5:
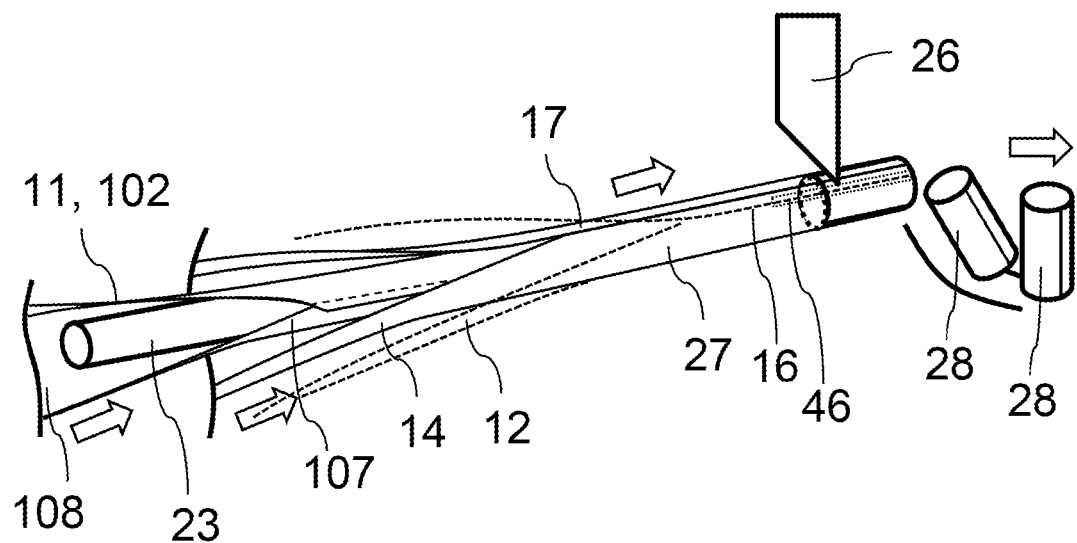
FIG. 5 schematically shows the manufacturing process of cylindrical can shells.

For production, the innermost winding, i.e. the innermost layer 11 acting as a barrier web, is formed around a mandrel 23, as shown in FIGS. 4 and 5. In this case, an edge region of the layer projecting beyond the circumference of the winding is preferably placed on the outside over the other edge region. The two superimposed edge regions are preferably connected to one another, e.g. welded, by means of induction or ultrasonic welding if the plastic layer comes to rest on the plastic layer in the overlap, or glued if at least one of the adjacent layers of the overlap is made of paper. As shown, an adhesive or filling material, in particular glue 22, can be applied in the overlapping area 52, so that the two edge regions of the wound layer lying one on top of the other are adhered to each other.

A next layer 14 of cardboard composite material is wound simultaneously and spatially offset slightly as shown in FIG. 5 around the mandrel 23 and the existing layer 11, which has been connected here according to the version of FIG. 4, and the next layer 14 is connected thereto with bonding. The edge regions of the second layer 14 are preferably ground stepwise so that they can be positively connected to each other by overlapping and this overlap is glued to form a central seam 17. In FIG. 5 it is also shown that a third layer 12 of cardboard composite material, i.e. the outer layer, also temporally and locally very slightly offset around the then central layer 14, may be wound and the positive overlap may also be glued to form the outer seam 16. The outermost layer may be coated with an outer material, for example, with a layer with very fine holes, so that water vapor may escape from the can body, while conversely, no penetration of water vapor into the can is possible. This coating is preferably polyethylene PE, polypropylene PP or polyethylene terephthalate PET. The outermost seam 16 can be sealed with a sealing strip (shown dotted) made of PE, PP, PET with/without bonding agent or adhesive and this sealing strip is applied depending on its form with or without heat. Instead of sticking a strip 46 onto the resulting continuous tube 27 moving on the mandrel 23, the seam 16 of the outermost layer may be sealed by means of hot and thus liquid PE.

For the industrial production of cans made of cardboard composite material this material is supplied in the form of prefabricated sheets of kraft paper with its respective coating in rolls, the material is unrolled from these and fed to the winding device illustrated in FIG. 5. In the example of FIG. 5, for example, three rollers would be present as webs for the three layers 11, 14 and 12 to be wound. After unrolling, preferably the edge regions of the webs 14, 12 are ground by a machine to produce an inclined surface 44 or a step 21. It is mainly these rollers, together with the glue and the bottom and cover elements, which can be supplied to the can filler for the production of the fluid containers, but no empties and thus no more bulky goods.

Before being supplied to the winding device, the webs 11, 14, 12 are coated on one of its flat sides with an adhesive, preferably glue.

Thereafter, as shown in FIG. 5, the "continuous" webs of the individual layers 11, 14, 12, i.e. those first to form the innermost layer 11, are wound by a machine station around a steel mandrel 23 by feeding and pulling the layers along the stationary, cylindrical steel mandrel 23. The material webs run between the steel mandrel 23 and a plurality of contiguous rollers (not shown), each with a U-shaped cross section. With the innermost layer 11, the overlapping of the two edges of the barrier layer takes place, as shown in FIG. 4. Next the innermost layer 11 wound into a tube advances over a further section of the steel mandrel 23. Contact rollers (not shown) hold the innermost layer 11 fed on the mandrel 23, so that the innermost layer 11 is conveyed on the mandrel 23.

Next, the central layer 14 is applied to the innermost wrapping or layer 11 locally on the same machine just behind the innermost layer 11. The inclined surface 44, preferably cut into a step 21 or longitudinal edges of this central layer 14, are brought to overlap by the winding of the mandrel 23 and are glued by means of the previously applied glue. And finally, the outer layer is also applied at the same time and locally slightly set back on the previously wound layer 14.

The pipe 27 made of cardboard composite material, which is made of three bonded layers and shown in FIG. 5, is then forwarded to a cutting device 26, for example, a clocked back and forth guillotine, as shown in FIG. 5, which at desired locations cuts the pipe 27 into pipe sections 28. The cutting can be carried out not only with a preferably mobile guillotine, but also with a known multi-rotary blade machine. In this case, a carriage with several rotary blades moves at the production speed with the continuous tube 27 and can thus cut several pipe sections 28 in one operation. After cutting, the pipe sections 28 preferably pass through a heat tunnel to remove glue moisture. The heat can be generated in various ways. Preference is given to hot air.

Figure 6:
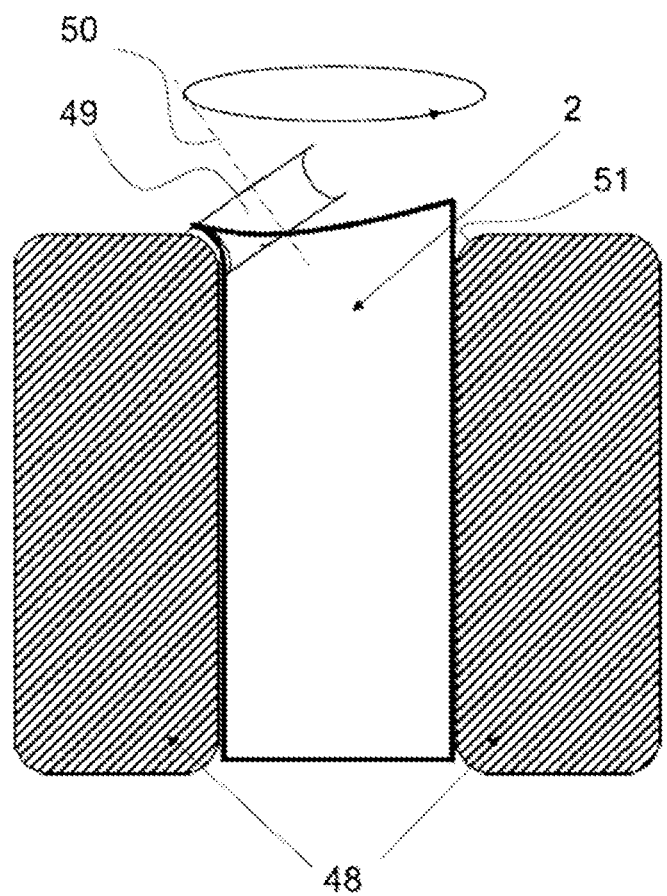
FIG. 6 schematically shows the bending of the edges of the can shell.
Figure 10:
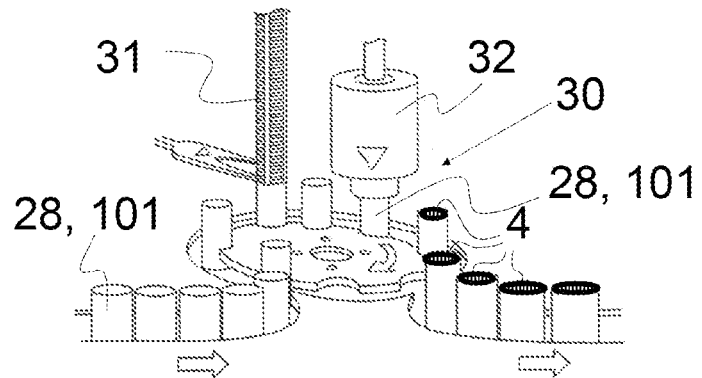
FIG. 10 schematically shows a first section of a plant according to the invention for filling cardboard or paper composite can shells and/or aluminum can shells.

After cutting the pipe sections 28 to the desired length, depending on the desired can volume, the cut edges of the open ends of the pipe sections 28 are formed in projections by a machine. For this purpose, rotating spreading tools are inserted from both sides into the open ends. FIG. 6 shows a possibility for this spreading. The can body 2 is inserted into a hollow cylinder 48, which has rounded inner edges 51. With a steel roller 49, which rotates about the axis 50, this curved inner edge 51 is retracted, wherein the axis 50 is moved so that it defines a cone wall. The steel roller 49 rolls the upper edge portion of the can body 2 in one or more passes on the curved inner edge 51 and spreads the layers slightly. The result is a projection, as shown in the following FIG. 7. The cut edges are preferably sealed after this carding or the spreading is carried out by painting with a dispersion adhesive, for example a liquid polyethylene PE or a dispersion adhesive or other suitable fast-setting and food grade adhesive so that moisture cannot penetrate into the interior of the kraft paper layer, since the subsequent filling inevitably takes place in a humid atmosphere. The cut edges are then once again treated with heat to minimize the setting time. For this purpose, infrared radiation is preferred at this point. Thereafter, these tube sections 28 are arranged in an upright position in a row in a transport device and then pass through a carousel 30, as shown in FIG. 10, on which a machine 32 initiates an isolated closure element, e.g. a bottom element 4, from a supply magazine 31, in the open top side of each pipe section 28 and forms the outer edge region of the radially outgoing bottom edge of the closure element in the radial direction around the edge region of the open pipe section 28 in a seal tight manner.

Figure 7:
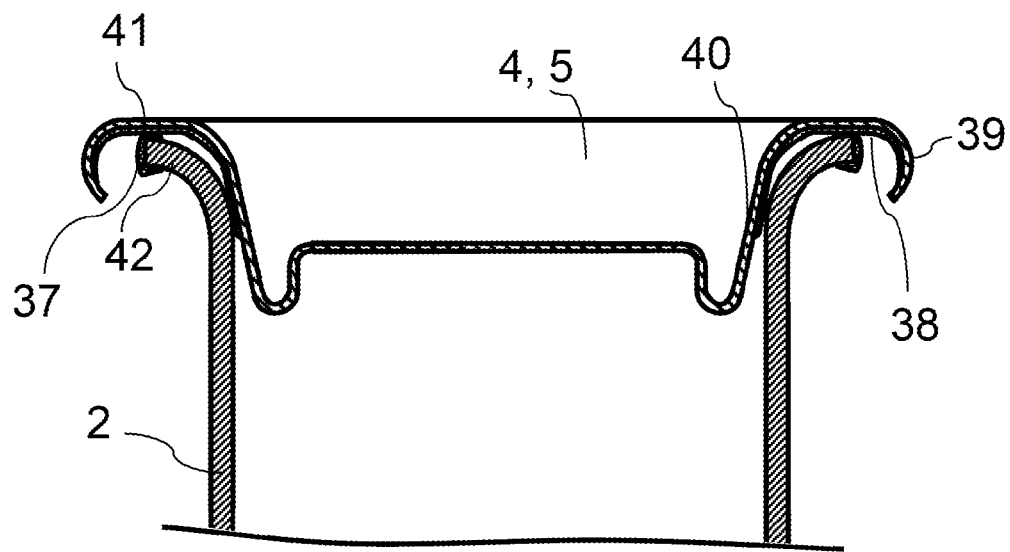
FIG. 7 schematically shows the placement of a closure element.

FIG. 7 illustrates this process of tightly crimping a closure element in the form of a bottom element 4 or cover element 5. The bottom element and cover elements may be standard bottoms or standard covers which are used to seal conventional aluminum cans and which can then be assembled with the same machines. The bottom element 4 or cover element 5 is made of aluminum and has a radially protruding edge region 41, i.e., an area that projects beyond the diameter of the can body 2. The bottom 4 or cover element 5 with the edge region 41 is brought to overlap with the edge region 42 of the can body 2 by a machine. After that, the crimping is carried out by the machine 32, which for this purpose crimps the cantilevered two-layer sections 41, 42, i.e., the edge portion 41, together with the edge portion 42 of the can body, i.e., rolls it by approx. 360° or more, creating a tight formed seam. As shown in FIG. 7, the cut edge of the can body 2 is a seal 37, which consists of moisture-tight material. The cover element 5 or bottom element 4 usually has a composite material 38, which is an elastic sealing material, which is applied in the region of the protruding edge region 41 which faces the edge region 42 of the can body 2.

Preferably, the composite material 38 extends from the inside of the curl 39 (outermost downward curvature of the edge) of the cover element 5 or bottom element 4 to the shoulder 40 of the cover element 5 or bottom element 4, wherein the composite material 38 at least partially extends over the height of the shoulder 40 and at least partially beyond the inner radius of the curl 39. Preferably, the composite material 38 extends at least over half the height of the shoulder 40.

Figure 8:
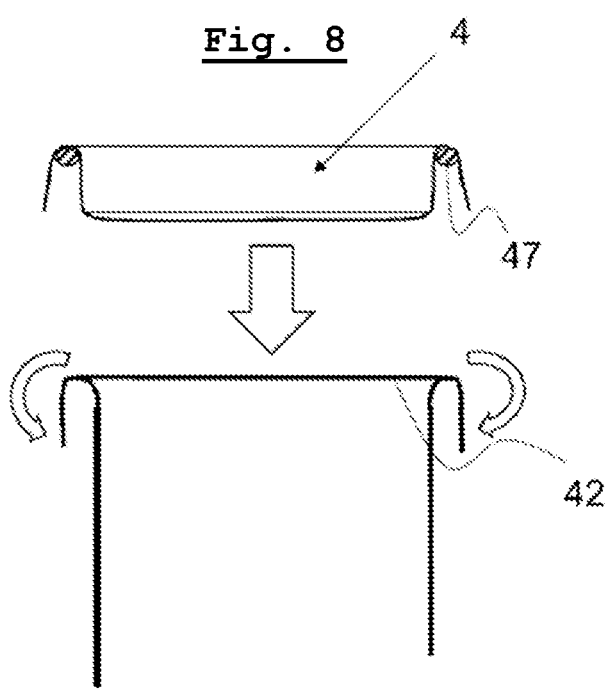
FIG. 8 illustrates another variant of a preformed contour in a diametric section, with a silicone-based sealing ring.

FIG. 8 shows an alternative bottom or cover 4, which is shown here in a diametric section. As can be seen, a silicone-based sealing ring 47 is inserted in the downwardly open channels formed by it. The cover is then installed as in a conventional aluminum can, with the same machines. The silicone seal provides additional proper tightness and the overlapping areas are rolled inwards together.

Figure 11:
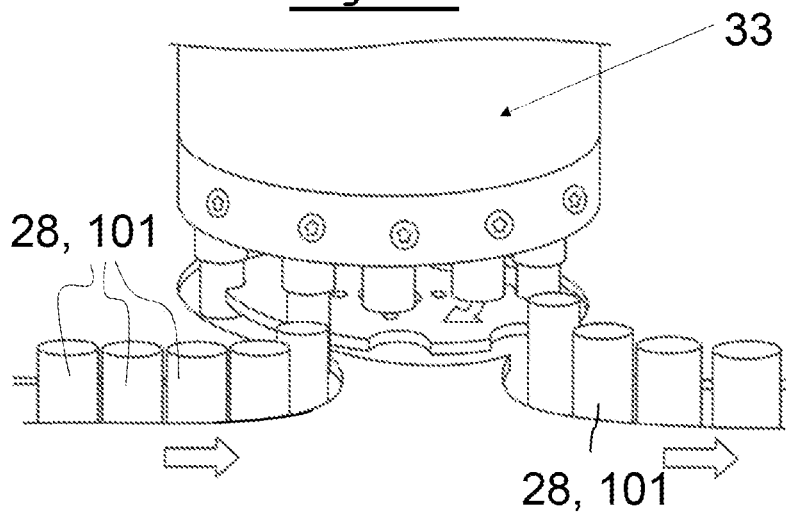
FIG. 11 schematically shows a second section of a plant according to the invention for filling cardboard or paper composite can shells and/or aluminum can shells.
Figure 12:
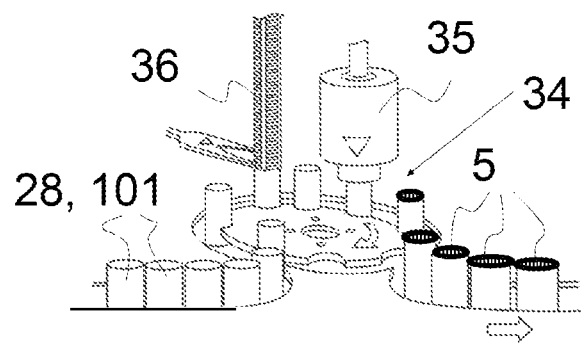
FIG. 12 schematically shows a third section of a plant according to the invention for filling cardboard or paper composite can shells and/or aluminum can shells.

FIG. 10 shows a rotary transfer machine 32 with a carousel 30, which mounts bottom elements on the can bodies and crimps the edges of the bottom elements with the edges of the can bodies, as described above. Next the unilaterally open pipe sections 28 are turned upside down in the conveyor channel, so that their open side is facing up, as shown in FIG. 11. Then they pass through a filling station 33, in particular a carousel filling station, which fills each pipe section 28 with a defined filling quantity. Finally, as shown in FIG. 12, the filled tube sections 28, which are closed at the bottom, pass through a carousel 34, on which a machine 35, from a supply magazine 36, inserts a singular cover element 5 with pull ring closure into the open top side of each filled tube section 28 and, in turn, the edge of the cover element 5 radially projecting in the radial direction is crimped in a sealing manner around the edge region of the open pipe section 28.

Figure 9:
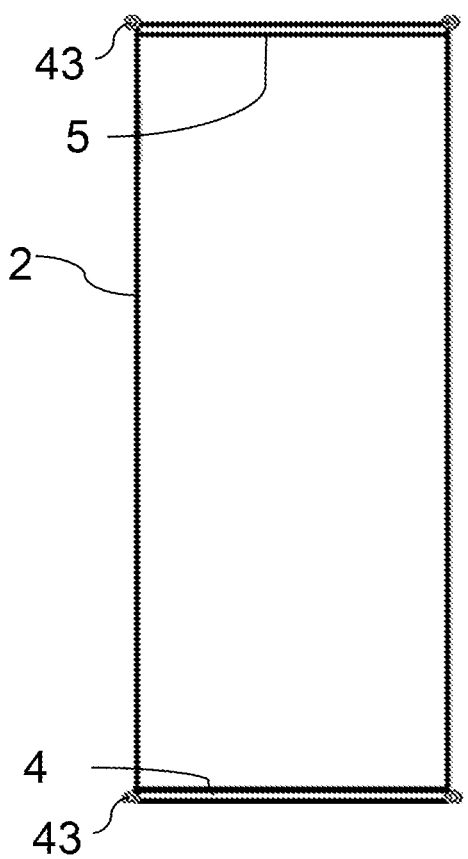
FIG. 9 illustrates the finished can in a longitudinal section in elevation, with the beaded tight edges on the bottom and cover.

A filled and sealed container 1 presents itself later as shown in FIG. 9, where it is shown in a section along its longitudinal axis. The can body 2 and the flanges 43 above and below can be seen with which the cover 5 and the bottom 4 are fixed in a sealed manner.

Figure 13:
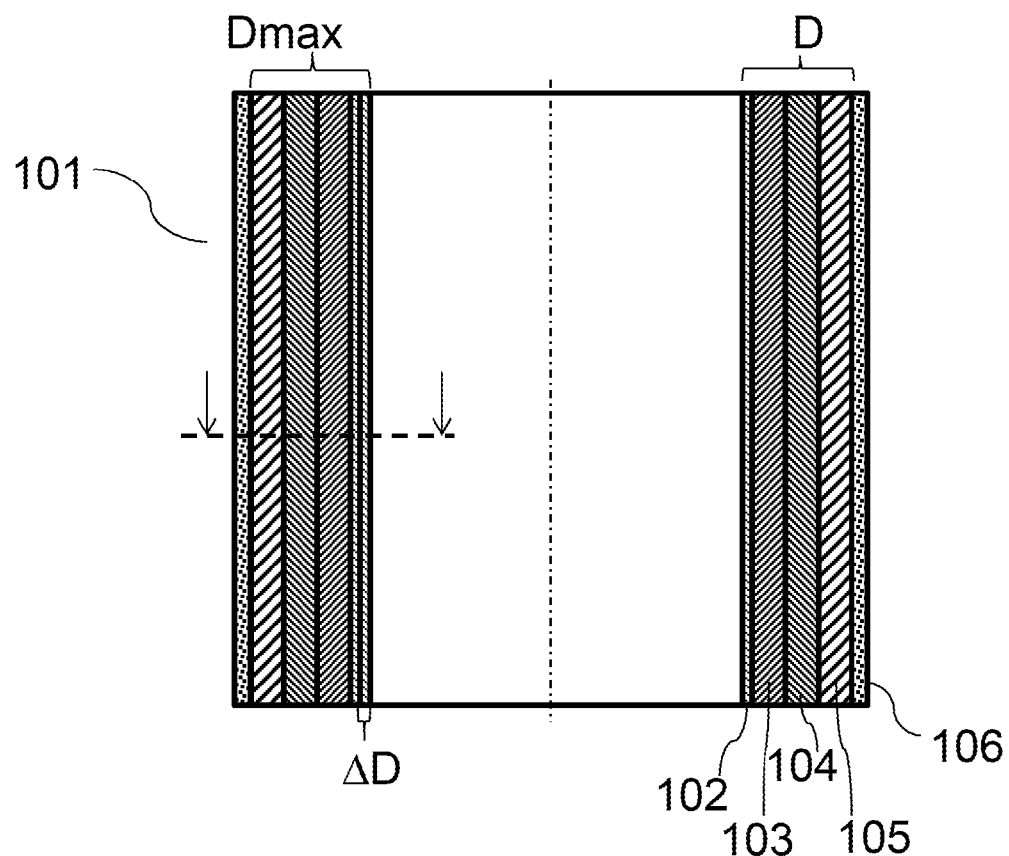
FIG. 13 shows a longitudinal section through a first embodiment of the cylindrical can shell according to the invention.

In FIG. 13, a first embodiment of can shell 101 is shown in longitudinal section through the cylindrical container. The can shell 101 has, from the inside to the outside, a barrier layer 102, a first middle layer 103, preferably a least one second middle layer 104, an outer paper or kraft paper layer 105 and an outer barrier layer 106.

The barrier layer 102 has, at one point of the circumference, an overlapping seam running in the longitudinal direction of the can shell 101, wherein in the overlapping seam two layers of the barrier layer 102 come to lie one above the other.

Figure 14:
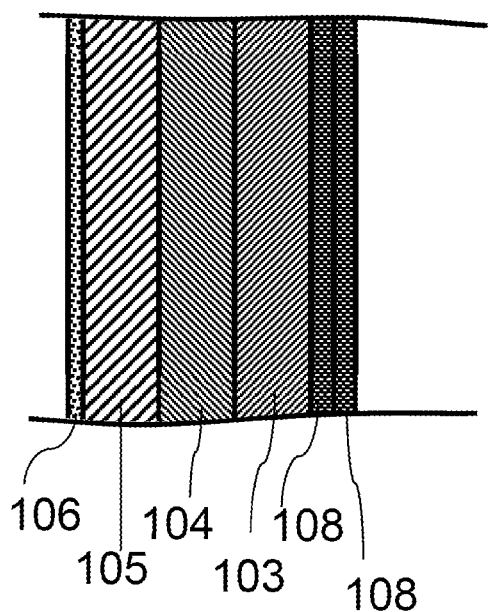
FIG. 14 shows the layer structure of the first embodiment in a detailed view of the longitudinal section.
Figure 15:
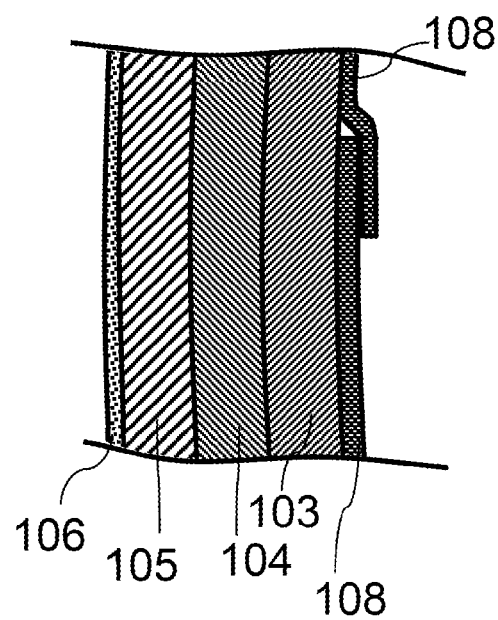
FIG. 15 shows the layer structure of the first embodiment in a detailed view of a cross section through the longitudinal seam of the barrier layer.

The first embodiment illustrated in FIGS. 13-15 comprises only a barrier film or a barrier laminate 108 made up of several film layers as the barrier layer 102. The barrier layer 102 is moisture-resistant and tight from both sides and on its cut edges. A simple overlap of the barrier layer 102 is sufficient to produce a tight longitudinal seam.

FIGS. 14 and 15 show the embodiment of FIG. 13 in detail, with the barrier layer 102 being shown here as a barrier laminate 108. It is advantageous that when producing the longitudinal seam, no dissimilar material has to be glued together, since dissimilar gluing, for example of paper material and plastic, generally requires more special adhesives and/or more time and leads to weaker connections than gluing paper to paper or plastic on plastic. In one embodiment, the barrier laminate is welded to itself in the overlap area. In addition to the variants of induction or ultrasonic welding already mentioned, welding can also be carried out in all embodiment of the present invention by direct heat applied to the plastic, for example by hot air.

The length of the overlap of the longitudinal seam in the circumferential direction of the can shell 101 is preferably between 1 and 6 mm, particularly preferably between 2 and 4 mm, in particular 3 mm.

Deviating from the FIG. 13-15, in the embodiments of FIGS. 16-31 it is provided for the barrier layer 102 to be designed as a composite of a kraft paper layer 107 and a barrier film or as a composite of a kraft paper layer 107 and a barrier laminate 108 of a plurality of film layers. This makes the barrier layer 102 easier to wrap and more stable.

Preferably, the length of the overlap of the longitudinal seam in the circumferential direction of the can shell 101 is between 1 and 6 mm, particularly preferably between 2 and 4 mm, in particular 3 mm.

Figure 16:
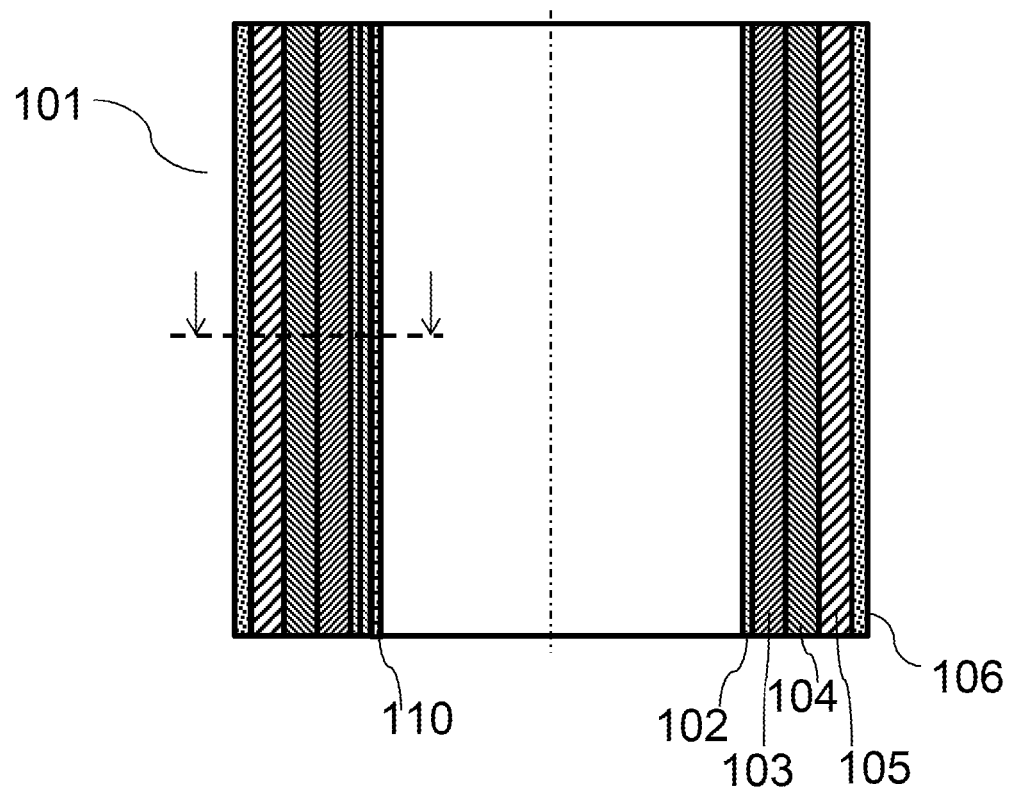
FIG. 16 shows a longitudinal section through a second embodiment of the cylindrical can shell according to the invention.
Figure 31:
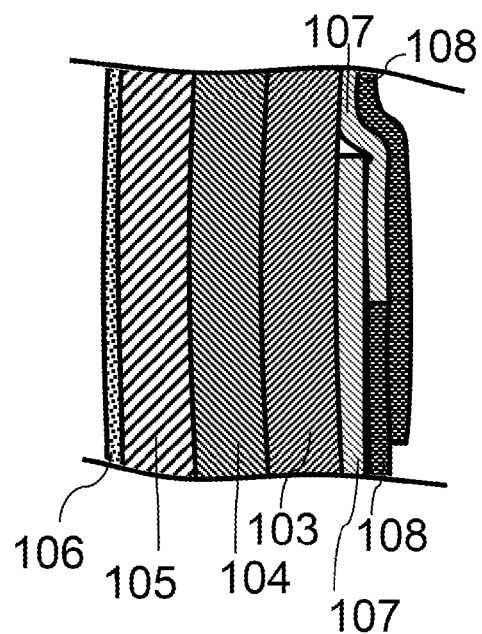
FIG. 31 shows the layer structure of the seventh embodiment in a detailed view of a cross section through the longitudinal seam of the barrier layer.

As shown in FIGS. 16 and 31, the innermost layer of the can shell 101 can be formed by the barrier laminate 108, which is preferably laminated on a kraft paper layer 107. Preferably, the bonding of the barrier laminate 108 and the kraft paper layer 107 already takes place before winding of the cylindrical can shell 101. The material of the barrier layer 102 is preferably produced in the form of a composite of the kraft paper layer 107 and the barrier laminate 108, subsequently wound into a roll and then provided as a roll for the winding process of the cylindrical can shell 101.

Figure 17:
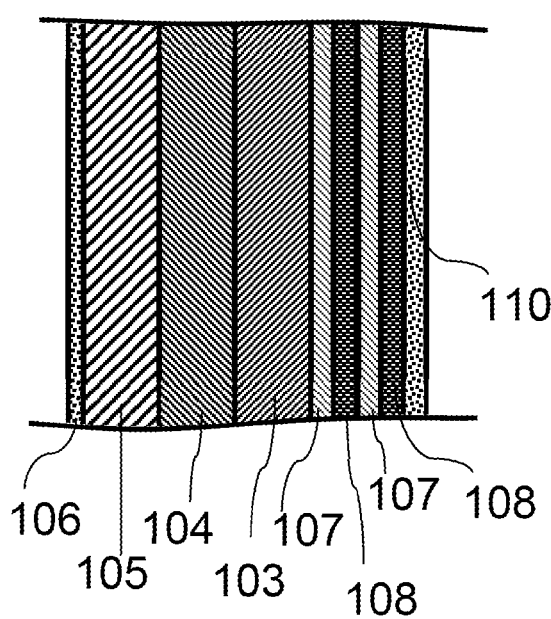
FIG. 17 shows the layer structure of the second embodiment in a detailed view of the longitudinal section.
Figure 18:
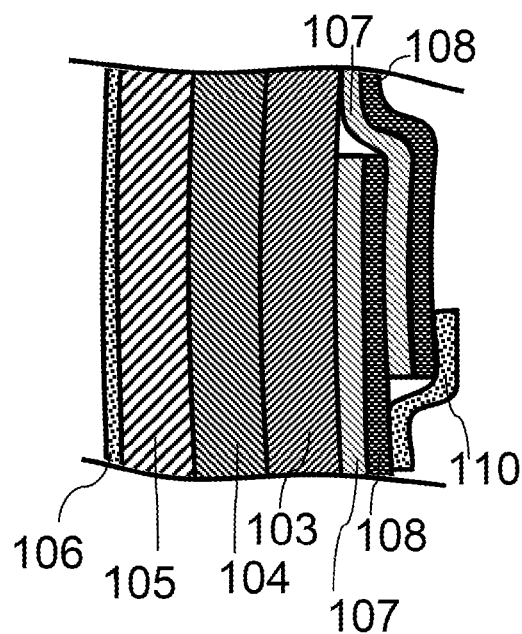
FIG. 18 shows the layer structure of the second embodiment in a detailed view of a cross section through the longitudinal seam of the barrier layer.

A second embodiment is illustrated in FIGS. 16-18.

In the area of the longitudinal seam, the barrier layer 102 has an overlap with itself in the embodiment of FIG. 16-18, wherein two layers of the barrier layer 102 come to rest on one another. In order to seal the inner cut edge of the barrier layer 102, a sealing strip 110 is attached, which projects beyond the cut edge on both sides and is glued or welded to both inner film sections of the barrier laminate 108 there.

In the area of the longitudinal seam, seen from the inside to the outside, first is the sealing strip 110 followed by a layer of the barrier laminate 108, followed by a kraft paper layer 107, wherein these are already firmly bonded to each other before winding. The kraft paper layer 107 is adjoined by a further layer of the barrier laminate 108, wherein these are preferably adhered to one another during winding. The further layer of the barrier laminate 108 is followed by a further kraft paper layer 107, wherein these are already firmly connected to each other before winding.

Figure 19:
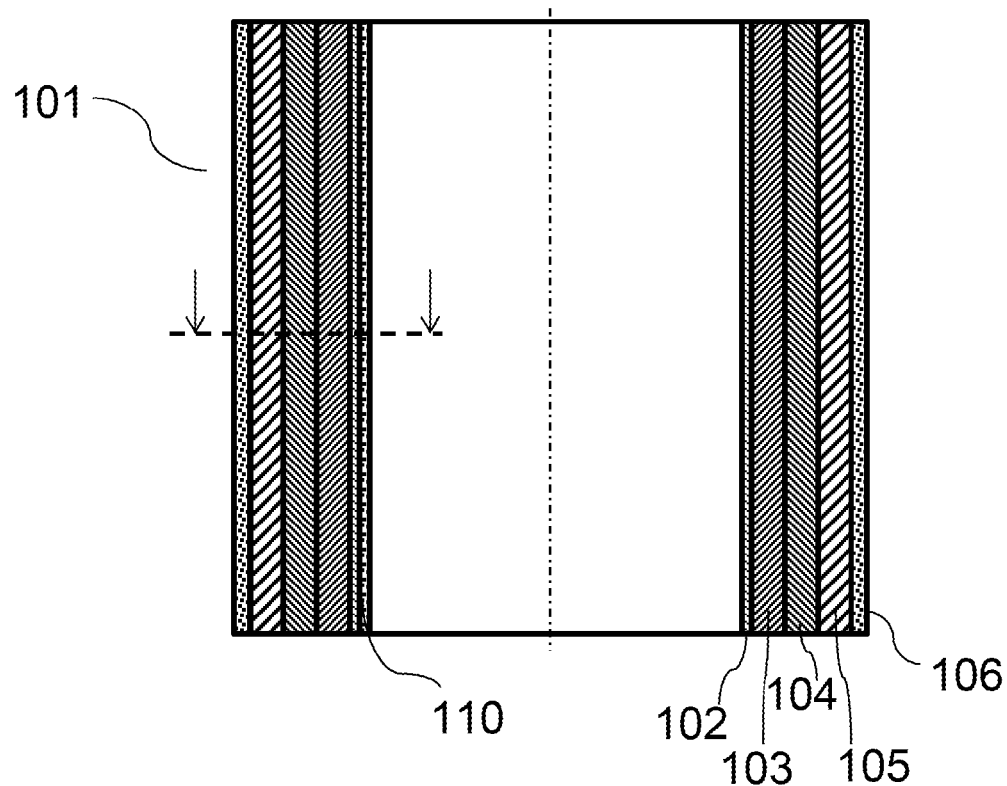
FIG. 19 shows a longitudinal section through a third embodiment of the cylindrical can shell according to the invention.
Figure 20:
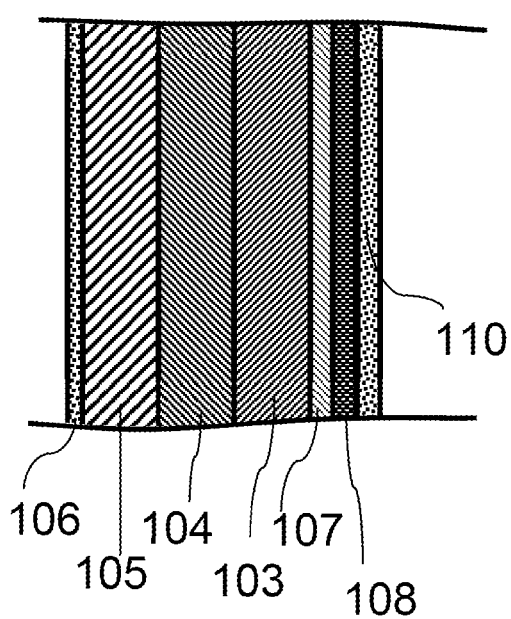
FIG. 20 shows the layer structure of the third embodiment in a detailed view of the longitudinal section.
Figure 21:
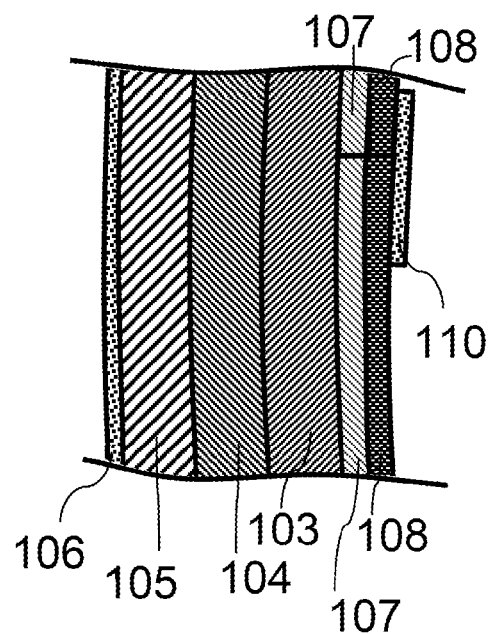
FIG. 21 shows the layer structure of the third embodiment in a detailed view of a cross section through the longitudinal seam of the barrier layer.

A third embodiment is illustrated in FIGS. 19-21. In this embodiment, the barrier layer 102 is wound without an overlap, so that the two edges of the barrier layer running in the longitudinal direction of the can shell 101 meet to form a butt joint. In order to seal the longitudinal seam that is an abutting edge, a sealing strip 110 is attached.

Less preferably, the abutting edge can be sealed or made liquid-tight by applying a liquid sealant, for example a hot melt.

Figure 22:
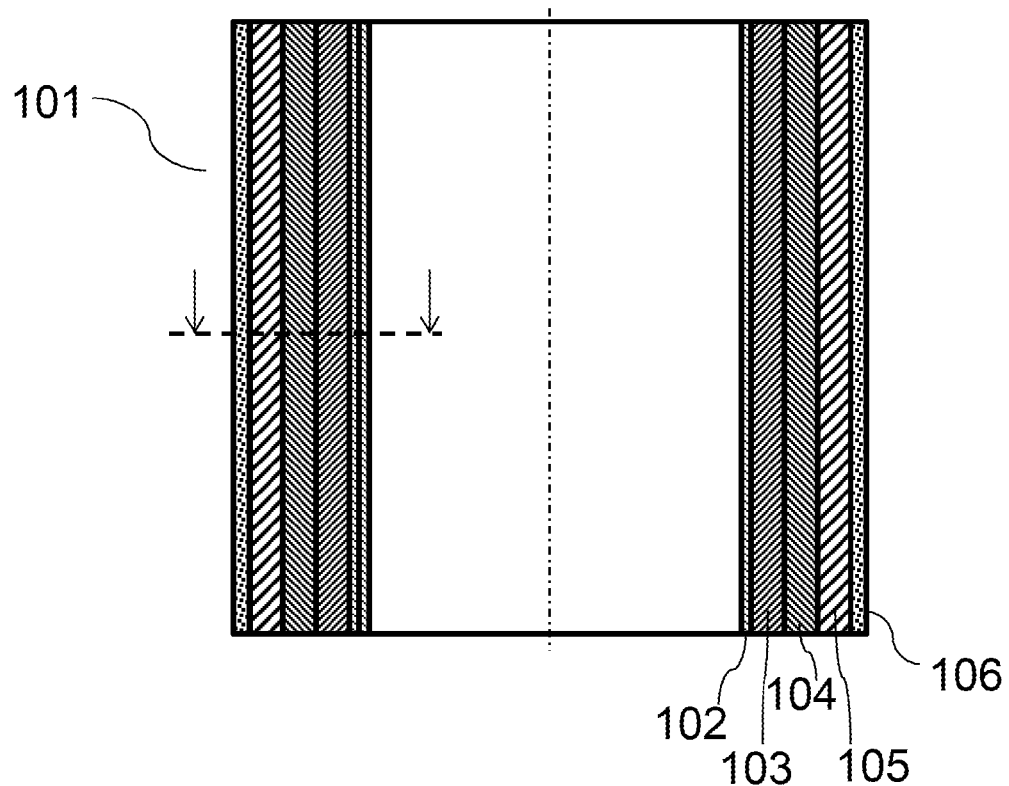
FIG. 22 shows a longitudinal section through a fourth embodiment of the cylindrical can shell according to the invention.
Figure 23:
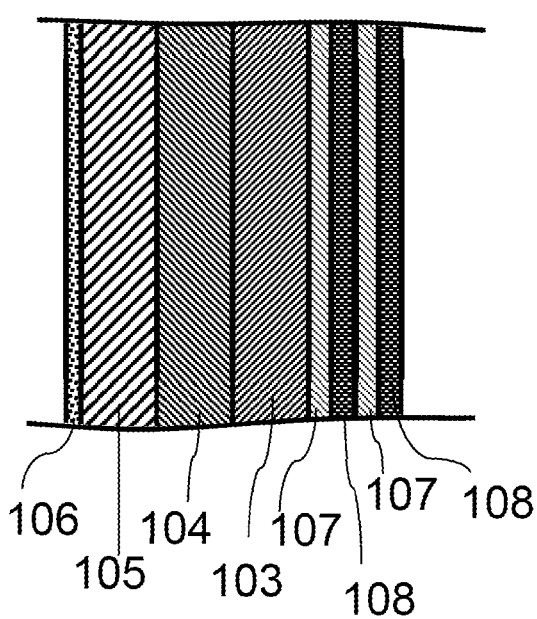
FIG. 23 shows the layer structure of the fourth embodiment in a detailed view of the longitudinal section.
Figure 24:
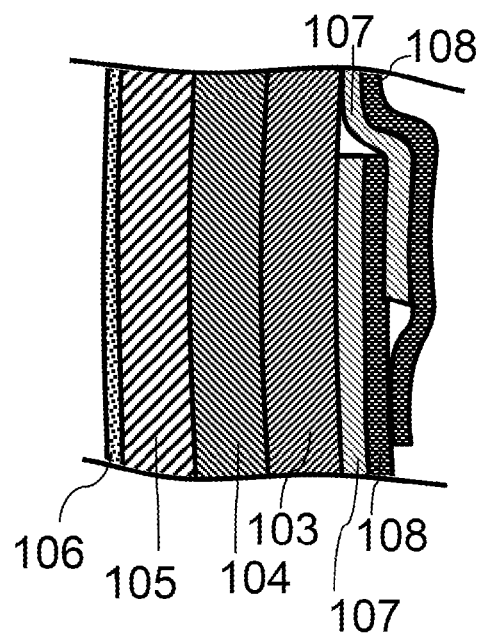
FIG. 24 shows the layer structure of the fourth embodiment in a detailed view of a cross section through the longitudinal seam of the barrier layer.

A fourth embodiment is illustrated in FIGS. 22-24. In this embodiment, the barrier laminate 108 or a barrier film projects beyond the kraft paper layer 107, so that the cut edge of the kraft paper layer 107 is covered or sealed by the barrier laminate 108 or a barrier film. In FIG. 24, both the kraft paper layer 107 and the barrier laminate 108 of a first edge region overlap the kraft paper layer 107 and the barrier laminate 108 of the second edge region, with the barrier laminate 108 of the first edge region overlapping the second edge region a longer distance than the kraft paper layer 107.

Figure 25:
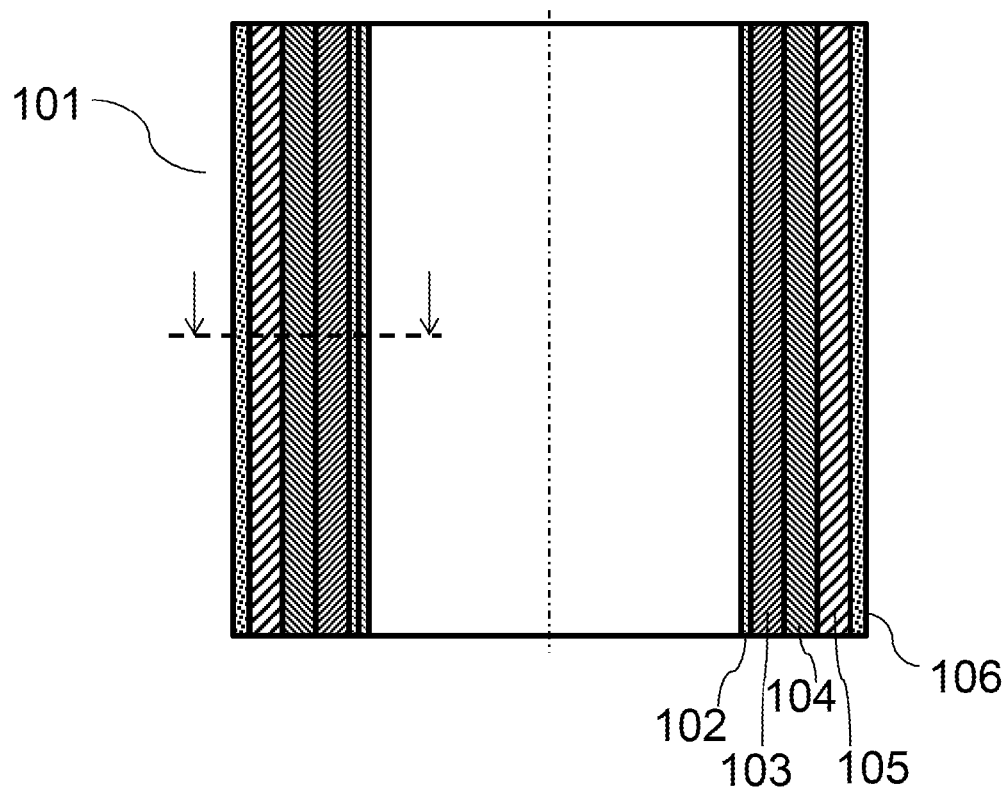
FIG. 25 shows a longitudinal section through a fifth embodiment of the cylindrical can shell according to the invention.
Figure 26:
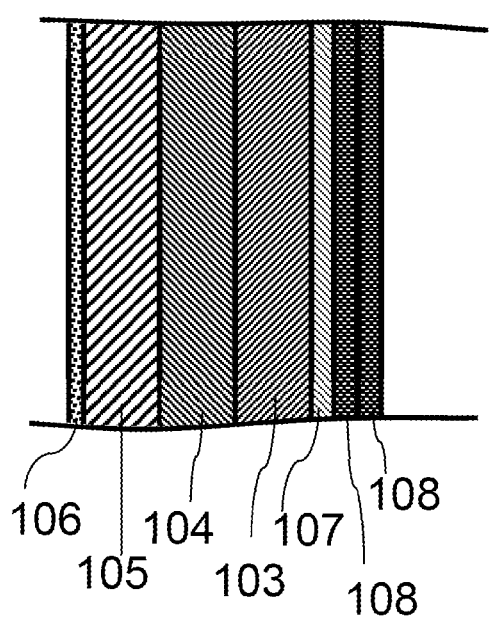
FIG. 26 shows the layer structure of the fifth embodiment in a detailed view of the longitudinal section.
Figure 27:
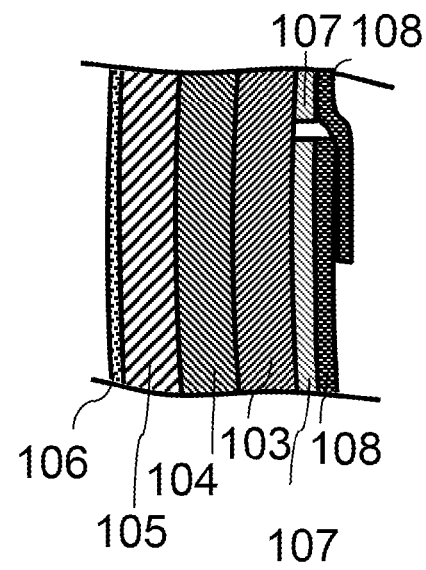
FIG. 27 shows the layer structure of the fifth embodiment in a detailed view of a cross section through the longitudinal seam of the barrier layer.

A fifth embodiment is illustrated in FIG. 25-27. In this embodiment, the barrier laminate 108 or a barrier film projects beyond the kraft paper layer 107, so that the cut edge of the kraft paper layer 107 is covered or sealed by the barrier laminate 108 or a barrier film. In the embodiment shown in FIG. 27, only the barrier laminate 108 of a first edge region overlaps the kraft paper layer 107 and the barrier laminate 108 of the second edge region. The kraft paper layer 107 of the first edge region a butt-joint with the kraft paper layer 107 of the second edge region, whereby, as shown, there may also be a small gap between the edges of the kraft paper layers.

Figure 28:
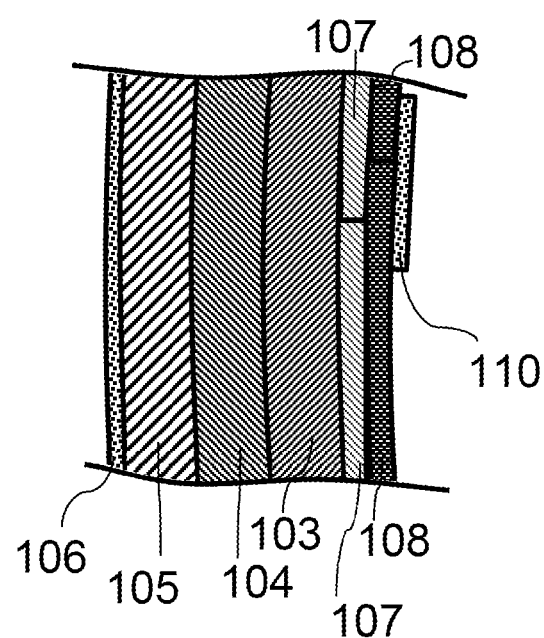
FIG. 28 shows a longitudinal section through a sixth embodiment of the cylindrical can shell according to the invention.

A sixth embodiment is illustrated in FIG. 28. In this embodiment, the barrier laminate 108 or a barrier film projects beyond the kraft paper layer 107 at a first edge region and at the second edge region the kraft paper layer 107 projects beyond the barrier laminate 108. The barrier laminate 108 of the first region comes to rest on the inside of the exposed kraft paper layer 107 of the second region. As shown, the two edges of the barrier laminate 108 can meet abutting, in which case a sealing strip 110 covers the abutting edge. In another embodiment, the barrier laminate 108 of the first edge region overlaps the barrier laminate 108 of the second edge region, in which case no sealing strip 110 is required.

Figure 29:
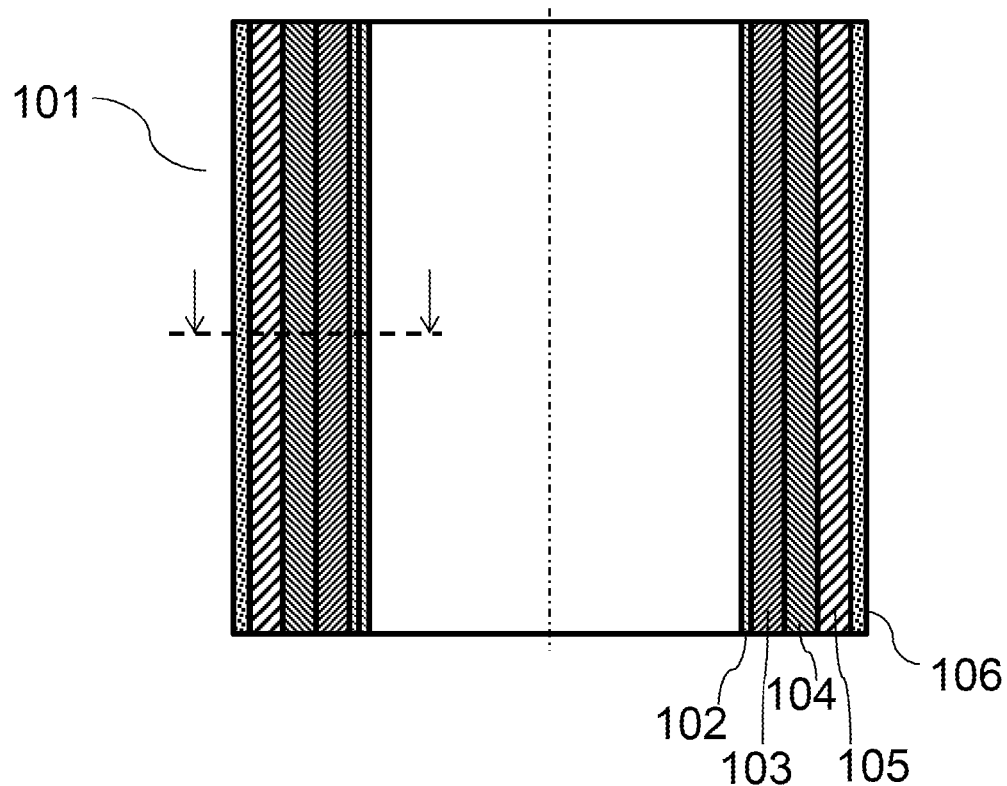
FIG. 29 shows a longitudinal section through a seventh embodiment of the cylindrical can shell according to the invention.
Figure 30:
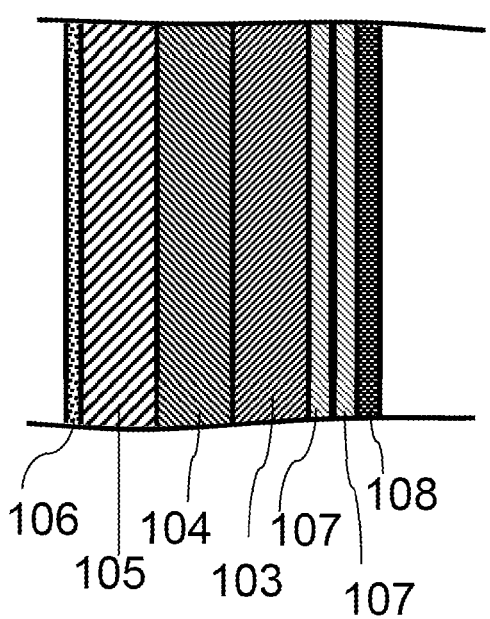
FIG. 30 shows the layer structure of the seventh embodiment in a detailed view of the longitudinal section.

A seventh embodiment is illustrated in FIGS. 29-31. In this embodiment, the barrier laminate 108 or a barrier film projects beyond the kraft paper layer 107 at a first edge region and at the second edge region the kraft paper layer 107 projects beyond the barrier laminate 108. The kraft paper layer 107 of the first edge region comes to rest on the inside of the exposed kraft paper layer 107 of the second edge region. The kraft paper layer 107 of the first edge region can lie in abutment with the barrier laminate 108 of the second edge region or have a gap thereto. The barrier laminate 108 of the first edge region overlaps the barrier laminate 108 of the second edge region and is adhered or welded to it. The two superimposed kraft paper layers 107 of the first edge region and the second edge region can be adhered to each other, in particular with glue.

In all embodiments of FIGS. 16-31, the outer layer of the barrier layer 102 is thus formed over the entire circumference by the kraft paper layer 107. The kraft paper layer 107 is preferably untreated on the outside, i.e. not painted or laminated, so that the outside is formed by kraft paper material.

In the embodiments of FIGS. 16-31, the inner middle layer 103 is placed around the outer side of the barrier layer 102 during the winding process, wherein the middle layer 103 is not treated i.e. not coated or laminated on the inside and on the outside. The inner side of the inner middle layer 103 is glued over its entire surface with the outer side of the barrier layer 102 so that here preferably kraft paper material is glued directly with kraft paper material so that glue can penetrate into the fiber matrix of both layers, whereby a particularly high final strength of the adhesive bond is achieved.

Less preferably, other adhesives such as hotmelt adhesives or two-component adhesives, may also be used, wherein the lower final strength of the hot melts and the difficulty of processing the two-component adhesives may be cited as significant disadvantages over glue or water-based adhesives. Glues herein are understood to be aqueous solutions of adhesives. In particular, known paper glues can be used.

Less preferably, a combination of two or more different adhesives may be used, which could be used together for bonding two layers, or respectively for bonding different layers. For example, hotmelt and water-based adhesive can be applied side by side on a layer for bonding two layers together.

Solvent-based adhesives and glue can be applied particularly in the liquid state or as foam.

Foam has the advantage that it can cover the surface to be adhered or glued with less liquid content compared to a non-foamed adhesive or glue.

In the case of FIGS. 13-15, the inner middle layer 103 is wrapped around the barrier laminate 108 or a barrier film. In an embodiment, the inner middle layer 103 has a coating made of plastic or a laminated film on its inside. In this embodiment, the coated or laminated side of the inner middle layer 103 can be glued or welded to the barrier laminate 108 or the barrier film.

As shown in FIG. 13-33, preferably at least one further middle layer 104 is placed around the outer side of the inner middle layer 103 during the winding process, wherein preferably this further middle layer 104 is not treated, i.e. not coated or laminated on the inner side.

The use of at least two middle layers 103, 104 is more complex and associated with higher material costs than using only a thicker layer for the can shell; however, it is advantageous that the two thinner layers, in particular kraft paper layers, can be processed faster on the winding machine and that the stability of the can body could surprisingly even be increased compared to the use of one thicker layer.

Preferably, two middle layers 103, 104 and an additional paper or kraft paper layer 105 are used, as shown in FIGS. 13-33, wherein the inner middle layer 103 and each additional middle layer 104 preferably are uncoated on both sides and the outer paper or kraft paper layer 105 is preferably untreated or uncoated at least on the inside.

A particularly preferred can shell is manufactured with a height in the range from 130 mm to 150 mm and an outer diameter in the range from 50 mm to 60 mm and an inner diameter range from 48.6 mm to 58.6 mm.

A particularly preferred sealed can has the dimensions: outer height 134 mm, inner height 133 mm, outer diameter 52.4 mm, inner diameter 51.2 mm, inner volume approx. 270-275 ml, filling volume 250 ml.

As described, the can has a barrier layer 102 as the innermost layer, which is formed from film material and kraft paper in the embodiments of FIG. 16-34 and which is formed from film material only in the embodiment of FIG. 13-15. The film material is preferably a composite film comprising an aluminum foil and at least one plastic film, which together form the barrier laminate 108. The barrier laminate 108 preferably has an aluminum foil, particularly preferably with a layer thickness from 6 to 9 μm, which is present between two plastic layers.

The barrier laminate 108 preferably has the structure of plastic film, preferably PE, aluminum foil, adhesion promoter preferably in the form of Surlyn, plastic film preferably PE from the inside to the outside. The individual layers of the barrier laminate 108 particularly preferably have the following thicknesses: plastic film 10-25 μm, bonding agent 2-5 μm, aluminum foil 6.5-7.5 μm, plastic film 10-25 μm.

The barrier laminate 108 preferably has a thickness from 30 μm to 55 μm. The barrier laminate 108 has a particularly preferred thickness of 35-50 µm, in particular 40-45 µm. Preferably, the barrier laminate 108 has a grammage of 45 to 75 g/m², in particular 50 g/m² to 65 g/m².

In one embodiment, the barrier layer 108 also comprises at least one layer of silicon-containing barrier material, in particular made of SiOx, which is present on or in the barrier laminate, or replaces one, several or all layers of the barrier laminate.

In one embodiment there is a layer formed from SiOx with a layer thickness of at least 50 nm, in particular at least 500 nm.

The kraft paper layer 107 of the barrier layer 102 preferably has a thickness from 60 µm to 90 µm. The kraft paper layer 107 of the barrier layer 102 particularly preferably has a thickness of 70-85 µm. The kraft paper layer 107 of the barrier layer 102 preferably has a grammage of 40 g/m² to 80 g/m², in particular 50-70 g/m², in particular 60 g/m².

The barrier layer 102 has a preferred layer thickness of 90 µm to 145 µm. The barrier layer 102 has a particularly preferred layer thickness of 110-135 µm.

The tensile strength MD of the kraft paper of the kraft paper layer 107 is preferably at least 4 kN/m, in particular at least 5.0 kN/m. The tensile strength CD of the kraft paper of the kraft paper layer 107 is preferably at least 2 kN/m, preferably at least 2.5 kN/m.

In a second embodiment of the barrier layer 102, this has, from the inside to the outside, the structure of the barrier laminate 108 with the layers: plastic layer in the form of a heat-sealing paint, preferably PET; aluminum layer in the form of an aluminum foil; plastic layer in the form of adhesive and kraft paper layer 107 made of kraft paper. The kraft paper of the kraft paper layer 107 preferably has a grammage of 40 g/m². The heat sealing lacquer preferably has a grammage of 1.6 g/m², the aluminum foil, a layer thickness of 7.7 µm and a grammage of 20.8 g/m², and the plastic layer of adhesive, a grammage of 2 g/m². Overall, this barrier layer 102 has a layer thickness of about 60 µm and a grammage of about 65 g/m².

The barrier layer 102 is wound around a mandrel in the longitudinal direction to form a longitudinal seam so that it forms a tubular body, with the inner plastic film of the barrier laminate 108 facing the mandrel and the kraft paper layer 107 facing away from the mandrel.

The next layer, i.e., the inner middle layer 103 is preferably made of kraft paper and particularly preferably has a grammage of 125 g/m², a tensile strength MD of >12 kN/m and a thickness of 0.160 µm. The kraft paper is untreated on both sides. Preferably, the inner kraft paper layer 103 has a grammage of 95 g/m² to 135 g/m² and/or a tensile strength of greater than 10 KN/m and/or a thickness of 0.140 mm to 0.175 mm.

The kraft paper layer is bonded directly and completely to the kraft paper layer 107 of the barrier layer 102, in particular by gluing, by being wound around the tubular body of the barrier layer 102.

For gluing, glue, preferably polyvinyl acetate, is preferably applied to the outside of the barrier layer 102 or the inside of the inner middle layer 103 in an amount of 10 to 25 g/m², in particular 15 to 20 g/m².

The next layer is the middle layer 104 by way of example made of kraft paper with a grammage of 125 g/m², a tensile strength of >12 kN/m and a thickness of 0.160 mm. The kraft paper is untreated on both sides. Preferably, the middle layer 104 has a grammage of 95 g/m² to 125 g/m² and/or a tensile strength MD of greater than 10 kN/m and/or a thickness of 0.140 mm to 0.175 mm.

This additional middle layer 104 is bonded directly, and in its entirety, to the underlying inner middle layer 103, in particular by being glued, by wrapping it around the tubular body of the barrier layer 102 and inner middle layer 103.

For gluing, glue, preferably polyvinyl acetate, is preferably applied to the outside of the inner middle layer 103 or the inside of the additional middle layer 104 in an amount of 10 to 25 g/m², in particular 15 to 20 g/m².

Preferably, the can body has a fourth layer, which is formed from the outer paper or kraft paper layer 105. The outer paper or kraft paper layer 105 preferably has a grammage of 80-130 g/m², in particular 100-120 g/m². The outer paper or kraft paper layer 105 preferably has a thickness of 70-120 µm, in particular 90-110 µm.

The outer paper or kraft paper layer 105 is applied in the winding installation over the middle layer 104 and adhered, preferably with glue, preferably polyvinyl acetate, in an amount of preferably 10 to 25 g/m², in particular 15 to 20 g/m², to the entire surface.

The can shell 101 preferably comprises the barrier layer 102, the inner middle layer 103, the middle layer 104, and the outer paper or kraft paper layer 105. The thickness D of the can shell is approx. 550 µm. The can shell 101, consisting of the barrier layer 102, the inner middle layer 103, the middle layer 104 and the outer paper or kraft paper layer 105, preferably has a total thickness of 500-650 µm, more preferably 550-620 µm. The can shell 101 consisting of the barrier layer 102, the inner middle layer 103, the middle layer 104 and the outer paper or kraft paper layer 105 preferably has a tensile strength CD of greater than 300 N/15 mm, in particular greater than 350 N/15 mm, i.e., greater than 20 kN/m in particular greater than 23 kN/m. Preferably, the can shell 101 consisting of the barrier layer 102, the inner middle layer 103, the middle layer 104 and the outer paper or kraft paper layer 105 has a grammage of at least 400 g/m², in particular at least 450 g/m².

Preferably, this outer kraft paper layer 105 is provided on the side facing the outside of the can with an outer barrier layer 106, for example a single-layer barrier film, with or without pinholes, preferably polyethylene (PE) with a grammage of 15 g/m² and/or a thickness of 15 microns or coated with a varnish.

Alternatively, the outer layer may consist only of an outer barrier layer 106 in the form of a barrier film, with or without pinholes, preferably PE with 25 g/m². In this case, the inner middle layer 103 and second middle layer 104 may be adjusted in their material thickness so that the total material thickness of the can shell is maintained.

Depending on the height and diameter of the can, it is envisioned that the number of middle layers 104 may be greater than one, for example, for a can having a height of 245 mm and a diameter of 175 mm, a number of two central layers are preferred. With the preferred thicknesses per layer 103, 104, 105 of 0.160 µm and thickness of the barrier layer 102 of 127 µm, the total thickness D of 767 µm results, for example.

Depending on the height and diameter of the can, it can be provided that the inner middle layer 103, the middle layer 104 and the outer kraft paper layer 105 have greater strength, for example in the case of a can with H: 245 mm and D: 175 mm with a thickness of 265 µm each. With a thickness of the barrier layer 102 of 127 µm, for example, a total thickness D of 922 µm results.

Increasing the number of layers is advantageous over increasing the thickness of the layers since with thinner layers a higher process speed and a higher stability of the can body in relation to the overall grammage of the kraft paper used may be achieved.

The tensile strength index MD, as the quotient of the tensile strength MD and grammage of the kraft paper used for the kraft paper layer 107 and the layers 103, 104, 105, is preferably in the range of 70-120 Nm/g.

The tensile strength index CD, as the quotient of the tensile strength CD and grammage of the kraft paper used for the kraft paper layer 107 and the layers 103, 104, 105, is preferably in the range of 35-70 Nm/g.

The tensile strength index MD of the kraft papers used is preferably greater than 80 Nm/g. The tensile strength index MD is particularly preferably greater than 100 Nm/g.

The tensile strength index CD of the kraft papers used is particularly preferably greater than 40 Nm/g. The tensile strength index CD is particularly preferably greater than 50 Nm/g.

In addition to the kraft paper layer 107, the layer structure preferably comprises at least two further layers 103, 104 made of kraft paper with the specified tensile strength indices MD and CD. The kraft paper layer 107 or at least one of the further layers 103, 104 may also be formed from another cardboard material which has the specified tensile strength indices MD and CD. Kraft paper is distinguished from conventional papers by greater tensile strength indices MD and in particular CD (cross direction).

Preferably, the kraft paper of the kraft paper layer 107 and the kraft paper of the layers 103, 104 is unbleached. The paper or kraft paper of the outer paper or kraft paper layer 105 may be bleached, which may be advantageous for printing with designs on the outside thereof. The outer paper or kraft paper layer 105 may already be printed with a product design before being wound, and this printing may advantageously be present between the paper or kraft paper layer 105 and the outer barrier layer 106. The cutting in the cutting device 26 is then registered with respect to the printing.

Figure 32:
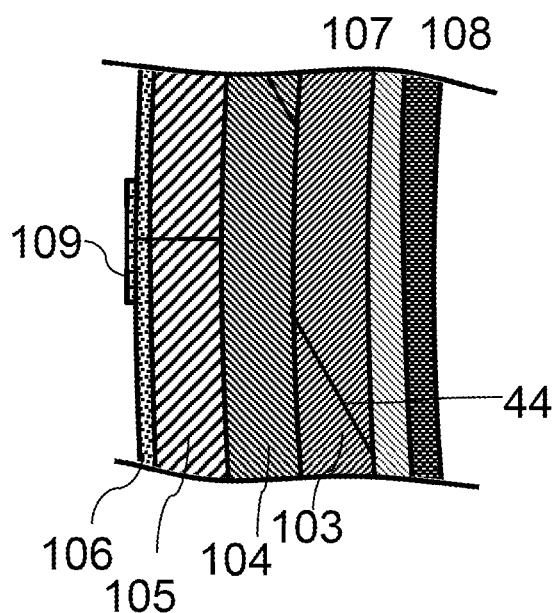
FIG. 32 shows the layer structure of a cylindrical can shell according to the invention in a detailed view of a cross section through the longitudinal seam of the barrier layer with a sealing strip on the outer seam.
Figure 33:
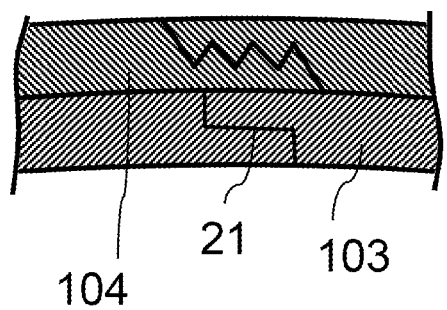
FIG. 33 shows schematically possible overlapping areas of the layers.

FIG. 32 shows a cross section through a particularly preferred construction of the can shell 101 according to the invention. In this construction, the inner middle layer 103 and the further middle layer 104 have obliquely shaped lateral edges so that the two edges of the layers opposite the respective web material overlap each other but without, or without substantial, increase in the layer thickness of the layer in the overlapping area. As an alternative to the oblique shape, other shapes of the edges are also suitable, such as stepped edges or interlocking edges, as illustrated in FIG. 33. Generally speaking, at least one of the two edges of at least one of the layers 103, 104, 105 is preferably provided with a shape which leads to a reduction in the thickness of the overlapping region of the two edges. Particularly preferably, both edges of at least one of the layers 103, 104, 105 are provided with a shape such that the thickness of the superimposed edges is equal to the thickness of the layer itself. Particularly preferably, the inner middle layer 103 is provided with such a structure. Preferably, at least one of the applied middle layers 104 is provided with such a structure, particularly preferably all applied middle layers 104.

As shown in FIG. 32, the edges of the outer kraft paper layer 105 preferably meet at the joint, wherein the gap is sealed in the joint region by applying a strip 109 (also referred to as a stripe) of PE, PET or PP, or a sealing material is applied by means of a spray head after the can body forming. The abutting edges of the outer kraft paper layer 105 are advantageous since the resulting gap is more regular and thus visually appealing and no reduction in the layer thickness of the edge region of the outer kraft paper layer 105 is present, which would be less stable to mechanical effects from the outside.

Less preferably, the edges of the inner middle layer 103 and/or the edges of the additional middle layers 104 may meet to form a butt joint in the respective layer, wherein it is assumed that this could adversely affect the stability of the layer structure.

To produce the can shell 101 according to the invention, the barrier layer 102 is first fed as web material in the longitudinal direction of a mandrel of a winding machine, and moved further in the longitudinal direction of the mandrel. The two edges are formed around the mandrel so that these edges meet on the other side of the mandrel and the mandrel is now enclosed by the web material.

To produce the longitudinal seam, the two edges of the web material of the barrier layer 102 lie one above the other on the mandrel. The barrier layer 102 is preferably not provided with glue on the outside.

Particularly preferably, therefore, the winding machine according to the invention is provided as an improvement of the known prior art with an applicator, for example with a nozzle, which applies adhesive (e.g., glue or hotmelt) in a targeted manner to at least one of the two juxtaposed regions of the barrier layer 102 in the area of the longitudinal seam.

This advantageously prevents air being trapped in the area of the overlap, which could adversely affect the stability of the can shell 101. The internal pressure of the can would pressurize entrapped air in the layer structure, which pressure of the entrapped air would stress the layer structure from within, or would cause the entrapped air to seek to escape towards the ends closed with covers, which may lead to creeping damage there.

In the next step, the inner middle layer 103 is placed around the barrier layer 102, in that it is also preferably fed as web material in the longitudinal direction of the mandrel of the winding machine and moved further in the longitudinal direction of the mandrel. The two edges of the inner middle layer 103 are formed around the barrier layer 102 located on the mandrel so that these edges meet on the other side of the mandrel and the barrier layer 102 located on the mandrel is now enclosed by the web material of the inner middle layer 103. As described, the edges of the inner middle layer 103 preferably overlap one another so that they are glued together. The inner middle layer 103 is provided with glue on the inside, for example by applying it during the feeding of the web material, wherein the glue when fitting or pressing the inner middle layer 103 to the kraft paper layer 107 of the barrier layer 102 is distributed over the entire area between the layers.

In the next steps 0 to preferably max. 3 additional middle layers 104 are successively laid around the inner middle layer 103, in which these are also preferably fed as web material in the longitudinal direction of the mandrel of the winding machine and moved in the longitudinal direction of the mandrel. The two edges of each additional middle layer 104 are formed around the inner middle layer 103 already located on the mandrel so that these edges meet on the other side of the mandrel and the inner middle layer 103 located on the mandrel is now enclosed by the web material. As described, the edges of each middle layer 104 preferably overlap one another so that they are glued together. Each middle layer 104 is provided with glue on the inside, for example by applying it during the feeding of the web material, wherein the glue when fitting or pressing the middle layer 104 to the inner middle layer 103 already located on the mandrel is distributed over the entire area between the layers.

In the next step, the outer paper or kraft paper layer 105 is formed around the outer layer 103, 104 already wound around the mandrel, in that it is also preferably fed as web material in the longitudinal direction of the mandrel of the winding machine and moved further in the longitudinal direction of the mandrel. The two edges of the outer kraft paper layer 105 are formed around the outer layer 103, 104 already located on the mandrel so that these edges meet on the other side of the mandrel and the layer 103, 104 already located on the mandrel is now enclosed by the web material. As described, the edges of the outer kraft paper layer 105 preferably do not overlap one another so that they meet at the joint. The outer kraft paper layer 105 is provided with glue on the inside, for example by applying it during the feeding of the web material, wherein the glue when fitting or pressing the outer kraft paper layer 105 to the layer 103, 104 wound below is distributed over the entire area between the layers.

As illustrated in FIG. 32, the outer kraft paper layer 105 may preferably already have an outer barrier layer 106, i.e. be supplied as a laminate or web material coated on one side so that it has a liquid-resistant or liquid-repellent outer side. For example, the outer kraft paper layer 105 may be provided with a waterproof or moisture-tight printing.

If the outer kraft paper layer 105 does not yet have a liquid-resistant or liquid-repellent outer side during feeding, it can be provided with such in the winding machine or after the winding machine. For example, a liquid-resistant or liquid-repellent film or a laminate may be applied around the outer kraft paper layer 105 within the winding machine. For example, after winding, the shaped hollow cylinder may be sprayed or printed with a liquid-resistant or liquid-repellent substance, in particular a paint. Should a liquid-resistant or liquid-repellent film or a laminate be applied around the outer kraft paper layer 105 with the winding machine, this film or laminate may be welded plastic-side on the plastic side to tightly enclose the outer kraft paper layer 105. In the case of a film, a simple overlap suffices. In the case of a laminate, for example made of film and thin printing or label paper, a folded seam may also be provided thereon. A barrier layer 106 may also be applied in the form of a printing or label layer, which is tight at least on its outside, over the outer kraft paper layer 105, which printing or label layer is then sealed, for example, with a glued-on strip 109 in the abutting region of its two edges.

If the outer kraft paper layer 105 already has a liquid-resistant or liquid-repellent outer side during feeding, in the next step, the joint region of the outer layer is preferably sealed on the winding machine, for example by applying liquid-resistant or liquid-repellent material as a liquid, or in the form of a strip 109, in particular adhesive tape.

The outer seam of the outer paper or kraft paper layer 105 or a further layer arranged above it can thus be designed as a folded seam, as a simple overlap or as a joint (butt joint seam). The butt joint seam may be sealed by hotmelt, a stripe or a tape or a sealing liquid, wherein these means are preferably applied at the winding machine after winding the outermost layer and before cutting the individual hollow cylinder. The stripe or the tape may be self-adhesive, or be present as a plastic strip, in particular PE strip, which is fixed by ultrasonic welding.

Preferably, hotmelt is applied in the winding machine with a nozzle to the paper tube located on the mandrel and moved past the nozzle. Preferably, the nozzle is directed perpendicular to the gap of a butt joint seam running in the longitudinal direction of the outermost layer of the paper tube applied in the winding machine. The nozzle may be cylindrical or rectangular in cross-section and have a straight or even opening surface.

Preferably, however, the nozzle opening surface is concave, as seen in the circumferential direction of the paper tube, that is adapted to the cylindrical shape of the tube, wherein the opening surface of the nozzle preferably has a uniform distance from the tube.

The hotmelt is preferably applied directly in the winding machine after winding the outermost layer, wherein the outermost layer is or has a tight outer barrier layer 106 already. The hotmelt is applied to seal the absorbent cut edges of the outermost layer and/or to seal the underlying layer 103 or 104 exposed along the butt joint seam. Preferably, the outer layer is formed from an absorbent material, in particular paper or kraft paper, which is provided on its outside with a moisture-resistant material, for example laminated with a moisture-resistant film or coated with a moisture-resistant substance. The gap of the butt joint seam is preferably in the range of 0.5-4 mm inclusive. Hotmelt is preferably applied in the form of a strip projecting over the gap of the butt joint seam, wherein the width of the strip of hotmelt is preferably at least 1 mm, in particular at least 2 mm wider than the width of the gap of the butt joint seam. For example, the width of the gap of the butt joint seam is 3 mm and the width of the hotmelt strip is 6 mm. The hotmelt is applied in heated state, for example at 160° C.-190° C. and hardened by cooling until the individual cylinders are cut from the mandrel 23 of the winding machine. This can preferably be supported by a cooling device, for example in the form of a blower. The sealing of the butt joint seam with an adhesive leads to a very flat or homogeneous outer circumference of the can. The film formed on the outer barrier layer 106 by the adhesive or hotmelt is, for example, only 0.05 to 0.1 mm thick. Instead of the outer kraft paper layer 105, comprising the barrier layer 106, it is also possible to use a different paper or cardboard material, preferably one made from or containing recycled paper or fiber material.

In a further embodiment of the outer layer sealing according to the invention the outer kraft paper layer 105 is provided with an outer barrier layer 106 in the form of a film, wherein the kraft paper layer 105 and the film are present as a laminate and thus fed together as a material web to the winding device. The film layer is designed to be longer in the cross direction of the material web than the kraft paper layer 105 so that the edge of the film layer protruding on one side comes to rest on the other non-protruding edge of the film layer. In this case, the protruding edge of the film layer may be melted or welded onto the film layer which does not overlap the kraft paper, or an adhesive may be applied to the underside of the overlapping region, in particular an activatable, in particular heat-activatable, adhesive, for bonding the film layer to itself.

After the layers have been wound and joined into a tubular body, individual hollow cylinders are cut from the mandrel using known cutting machines, as can be seen in FIG. 5.

The individual hollow cylinders are subsequently bent up at their two ends in the edge region.

The bending is preferably carried out in a length range of 5 mm, wherein the outer edge is bent outwards by 2.5 mm. From the outer edge, the bent-up region preferably merges along a circular path with a radius of preferably 3-4 mm, in particular 3.3-3.5 mm, into the not-bent-up shell region.

The cut or already bent edges are preferably provided with a sealing liquid so that their absorption capacity is reduced by moisture. This is preferably done by applying this sealing liquid during the bending process. Alternatively, the sealing of the cut edges can be carried out by applying a tape or a shrink tube.

The bent and finally sealed hollow cylinders are subsequently transferred to a can closing machine in which first one end, preferably the lower end, of the hollow cylinder is closed with a first closing element, for example first a bottom element 4. The bottom element 4 is preferably an aluminum bottom element of a conventional aluminum can, which has at least approximately the same volume or the same diameter as the present can.

Thereafter, the medium, in particular a carbonated beverage, is filled in the bottom closed hollow cylinder, preferably in an amount of 0.25 liters.

The filled hollow cylinder is subsequently closed at the top with a second closure element, for example with a cover element 5. The cover is preferably an aluminum cover of a conventional aluminum can, which has at least approximately the same volume or the same diameter as the present can.

The closing and filling is preferably carried out on a clocked plant with a throughput of 80,000 cans/hour.

Preferably, 40,000 can bodies/hour are produced on the winding machine, which means a speed of approximately 1.5 m/s of the finished pipe in the direction of the winding mandrel. The desired process output of 80,000 cans/h can be achieved by mirroring the machine, wherein the flanged can bodies from both machine units are brought together in front of the can bottom sealer.

Preferably, the present can shells 2, which originate from the slower winding system, may be closed together with conventional aluminum can shells at the same faster closure and filling plant, and more preferably with the same bottom elements and the same covers and without retooling or time interruption. This means that the speed of the winding system is no longer critical to the process and the filling plant can be operated independently of this with full process performance.

The composite cans according to the invention and conventional aluminum cans can be filled and closed in batches or alternately at the same plant so that the lower production speed of a single winding plant is compensated by the production of conventional aluminum cans. For example, 40,000 cans/hour and 40,000 aluminum cans/hour can then be produced at the plant so that advantageously two product lines, i.e., environmentally friendly composite cans and proven aluminum cans are produced simultaneously and continuously on a plant.

The need for composite shell cans according to the invention can be exactly met and the remaining capacity for standard cans used, which is particularly advantageous for product introduction since the sale of composite cans according to the invention would not initially lead to full utilization of a conventional filling plant. The simultaneous or sequential use according to the invention of the filling plant for cans according to the invention and conventional aluminum cans thus additionally reduces a further inhibition threshold for product conversion since aluminum cans can continue to be produced and can only gradually be replaced by composite cans to an increasing proportion.

Example 1

With the preferred layer structure according to one of FIG. 16-33, beverage cans having a height of 134 mm and an outside diameter of 52.4 mm and a filling volume of 250 ml of a carbonated beverage are produced. As a paper or kraft paper layer 105, a paper layer 105 of less tear-resistant, wood-free paper, specifically Lumiflex™ 110 gsm Stora Enso AG is used, which is provided with a PE coating on the later outside of the can. The beverage cans are sealed at the top and bottom with standard bottoms and covers of aluminum cans with standard closing equipment.

The layers used and the resulting layer structure are specified in the following table.

| | Grammage | Thickness | Tensile strength MD lso 1s24-2 | Tensile strength CD lso 1s24-2 |
|---|---|---|---|---|
| Barrier laminate 108 | 45 g/m² | 45 μm | Not determined | Not determined |
| Kraft paper layer 107 | 60 g/m² | 82 μm | 7.0 kN/m | 3.5 kN/m |
| layer 103 of Kraft paper | 125 g/m² | 160 μm | >10 kN/m | >5 kN/m |
| layer 104 of Kraft paper | 125 g/m² | 160 μm | >10 kN/m | >5 kN/m |
| Paper layer 105 | 110 g/m² | 101 μm | 7.3 kN/m | 0.7 kN/m |
| Outer barrier layer 106 (PE) | 15 g/m² | 15 μm | Not determined | Not determined |
| Total layer structure | approx. 500 g/m² | approx. 600 μm | not determined | >23 kN/m |

The tensile strength MD (Machine Direction) indicates the tensile strength of the kraft paper in the longitudinal direction of the can shell 101, tensile strength CD (Cross Direction) indicates the tensile strength of the kraft paper in the circumferential direction of the can shell 101. It can be seen that the conventional paper of the paper layer 105 used, in particular in the cross direction (CD), has a significantly lower tensile strength.

The grammage of the entire layer structure of the can shell 101 is increased compared to the sum of the individual layers due to the glue application of 18 g/m² per layer of glue. The glue application amounts to a total of 54 g/m² due to the three full-surface layers of glue.

As the barrier laminate 108, a laminate having the structure of PE plastic film of 25 μm thick, aluminum foil of 7 μm thickness, 3 μm thick Surlyn bonding agent, and PE plastic film of 15 μm thickness is used.

The cans thus prepared are suitable for the storage and transport of the carbonated beverage.

The particularly preferred layer structure of the container according to the invention therefore has an inner barrier layer 102 made of a barrier laminate 108 and a kraft paper layer 107 with a simple overlapping seam extending in the longitudinal direction of the can, above it are two wound layers 103, 104, each comprising an overlapping seam running in the longitudinal direction of the can, wherein layers 103, 104 comprise in the seam region at least at one edge with a reduced thickness, above kraft paper layers 103, 104 follows a wound layer of paper or cardboard material, which has, on the outside, an outer barrier layer 106 and a gap forming butt joint seam extending in the longitudinal direction of the can, which is sealed with hotmelt, wherein the layers 103, 104 at their kraft paper surfaces are adhered, in particular glued, directly to each other and to the underlying and overlying layers.

The advantages of the cans according to the invention are the recyclability and the good ecological assessment. Since the can of the materials used is similar to a plastic-coated cardboard packaging, the aluminum parts, the paper layers and the plastic films can be separated from each other and separated and sorted for recycling with known dissolution methods analogous to this. In particular, the high proportion of renewable shares, in particular in the form of paper, makes the can advantageous over cans made of aluminum and/or plastic. The ecological assessment of this can is better than that of conventional aluminum cans.

Figure 34:
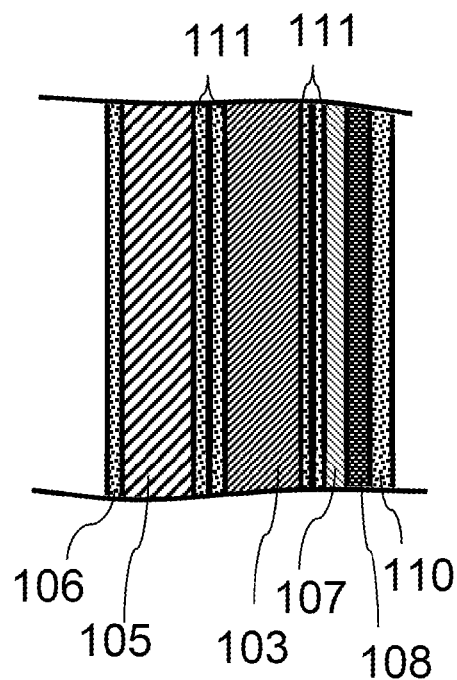
FIG. 34 shows a longitudinal section through an embodiment of the additional layer structure of a cylindrical can shell adjoining the barrier layer.

FIG. 34 shows a variant of a can shell 101 in longitudinal section through a longitudinal seam of the barrier layer for use in a can 1 containing a solid, liquid and/or a gaseous medium which may have positive pressure or may develop such during transport or storage, wherein the cylindrical can shell 101 of the can consists mainly of paper or cardboard material and comprises at least two wound layers and is closed at the bottom with a bottom element 4 and at the top with a cover element 5, wherein the can 1 withstands an internal pressure of at least 5 bar, wherein the innermost layer of the can shell 101 consists of a straight-wound barrier layer having a longitudinal seam extending in the longitudinal direction of the can 1, wherein the barrier layer is a laminate made of an of an inner diffusion-tight film or an inner diffusion-tight barrier element 108, a central paper or preferably kraft paper layer 107 and an outer plastic layer 111, wherein at least one further wound layer made of paper or cardboard material with an inner plastic layer 111 is present around the barrier layer of the can shell 101, wherein the adjoining plastic layers 111 of the barrier layer 102 and the further wound layer made of paper or cardboard material are welded directly to each other. The longitudinal seam can be made according to one of the embodiments of FIGS. 13-31.

The further wound layer of paper or cardboard material with an inner plastic layer 111 may also have an outer plastic layer 111.

In addition, one or more preferably a maximum of two further layers of paper or cardboard material, each with an inner plastic layer 111 and/or outer plastic layer 111, may be present, wherein the adjacent plastic layer 111 of the layers are welded together.

Figure 35:
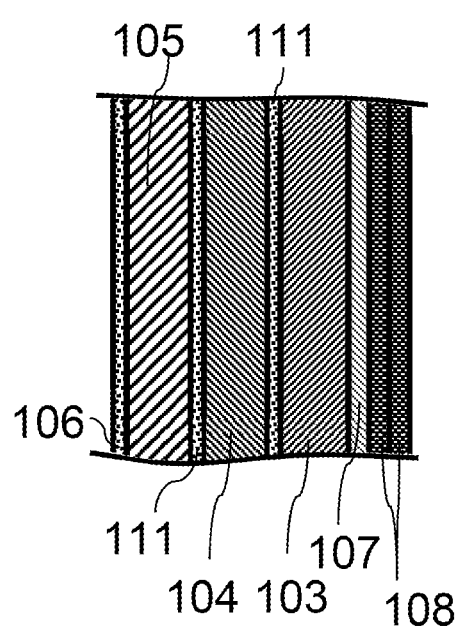
FIG. 35 shows a longitudinal section through a further embodiment of the additional layer structure of a cylindrical can shell adjoining the barrier layer.

As illustrated in FIG. 35, only one plastic layer 111 can be present between the further layers 103, 104, 105 of paper or cardboard material, for example by having it already present on one of the two adjacent layers before winding. In the variant of FIG. 35, there is no plastic layer 111 between the kraft paper layer 107 and the adjoining layer 103, so that paper material comes to lie on top of paper material.

In one embodiment, the layered structure thus comprises the barrier layer, the paper material of which is bonded, in particular glued, to the paper material of the following layer of paper or cardboard material, wherein between this following layer of paper or cardboard material and the outermost layer of paper or cardboard material of the can shell there is at least one plastic layer 111 between two of these layers. The at least one plastic layer 111 is advantageously used to connect the two layers by heating it. The fact that at least two layers are connected by heated or melting plastic reduces the amount of liquid introduced into the layer structure by adhesive or glue.

The direct bonding or gluing of two paper materials of at least two consecutive layers of paper or cardboard material creates improved stability of the can, with the barrier layer preferably being one of these layers, so that the barrier layer and the subsequent layer are connected particularly rigidly.

At least one plastic layer 111 that is arranged between two layers of paper or cardboard material is preferably provided with perforations or openings, so that moisture can be distributed through the plastic layer 111 between the layers of paper or cardboard material. As a result, the moisture brought in by adhesive or glue can advantageously be distributed between the layers of paper or cardboard material, so that the overall moisture content of the individual layers can be reduced.

The material of the plastic layer is preferably a polyolefin, in particular PE.

The embodiment of FIGS. 34 and 35 are advantageous regardless of how the barrier layer 102 and the outer barrier layer of the can are implemented. For example, the barrier material 108 of the barrier layer may be in the form of a film, laminate, composite film, or coating, or a combination thereof.

The further wound layers made of paper or cardboard material with their plastic layers 111 may in turn have a longitudinal seam, preferably with a reduced thickness in the overlapping region with itself. The outermost layer may again have a butt joint seam, with appropriate sealing of the gap.

The paper or cardboard material of one or more or all layers of the can according to the invention or according to the embodiments of the can may preferably be kraft paper or paper or cardboard material with comparable tensile indices MD (Machine Direction) and CD (Cross Direction).

FIGS. 36 to 41 show further embodiments in which the inner edge of the inner middle layer 103 following the barrier layer abuts an edge of the barrier layer 102 and the outer edge of the inner middle layer 103 overlaps the inner edge of the inner middle layer 103. There may also be a gap between the inner edge of the inner middle layer 103 and the edge of the barrier layer 102 due to production, depending on how precisely the edge of the inner middle layer 103 can be placed when wrapped around the barrier layer 102 located on the mandrel of the winding machine. The barrier layer 102 and the inner middle layer 103 each have an overlap with themselves, whereby they are wound straight and therefore comprise an edge running straight in the longitudinal direction of the endless tube formed on the mandrel.

Figure 36:
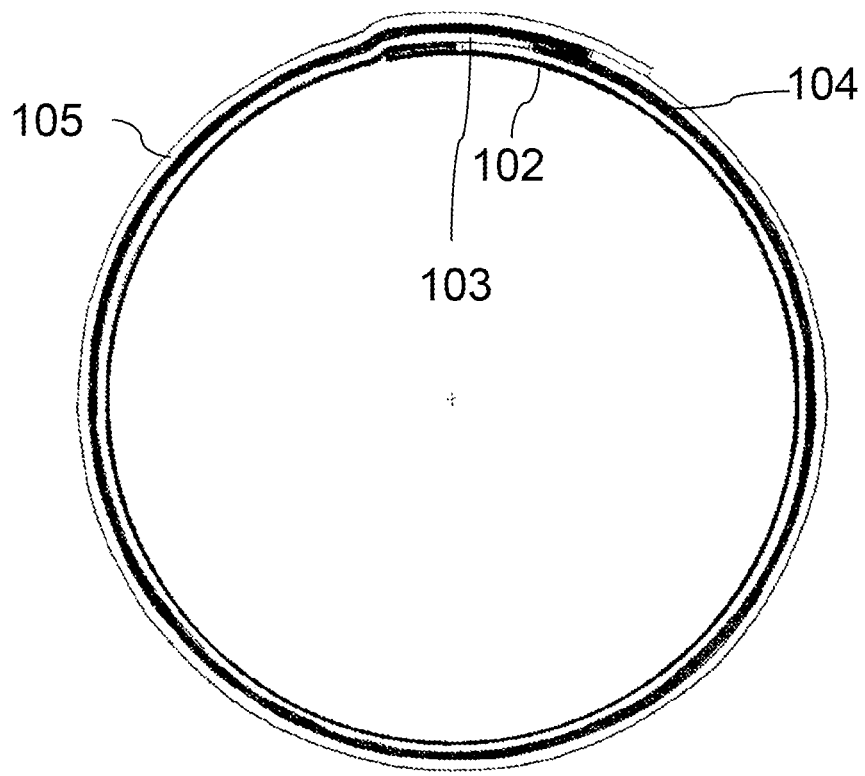
FIG. 36 illustrates a first embodiment with edges of the barrier layer that form a butt joint and the further layer lying above it.

It is preferred that the inner edge of a second middle layer 104 abuts the outer edge of the first middle layer 103 and the outer edge of the second middle layer 104 overlaps the inner edge of the second middle layer 104, as is shown in FIG. 36. If there are further middle layers made of paper or cardboard material, in particular kraft paper, it is preferred that they are embodied in the same way.

It is preferred that the inner edge of the outer paper or kraft paper layer 105 abuts the outer edge of the underlying layer 104 and the outer edge of the outer paper or kraft paper layer 105 overlaps the inner edge of the outer paper—or kraft paper layer 105, as shown in FIG. 36. As already described for the other embodiments, the outer paper or kraft paper layer 105 has an outer barrier layer 106, or is provided with one.

The middle layers 103 and 104 are preferably present with the same material thickness.

The further layers 103 and 104 can have a reduced material thickness in the area of overlap with themselves on one or both of the two overlapping edge regions.

Figure 37:
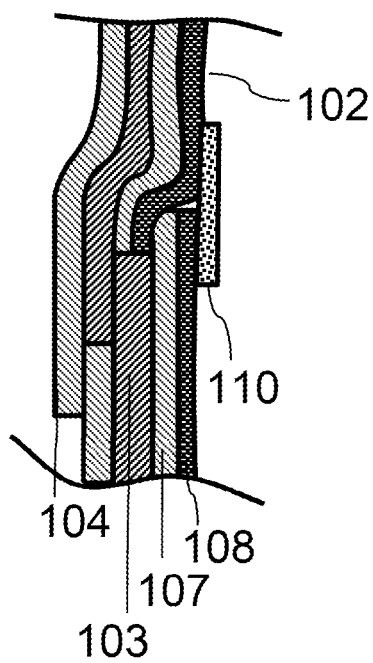
FIG. 37 illustrates a second embodiment with edges of the barrier layer that form a butt joint and the further layer lying above it.

As illustrated in FIG. 37, the edge of the barrier layer 102 may be formed by having a simple overlap with itself. As shown, it can be provided that the middle layer 103 is of the same thickness as the barrier layer 102. The middle layer 103 and the barrier layer 102 can also be present with different material thicknesses.

Figure 38:
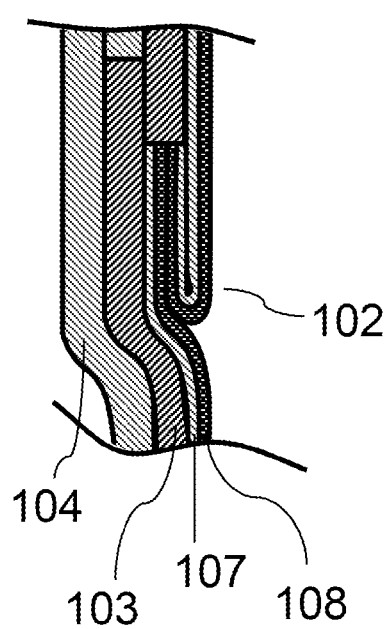
FIG. 38 illustrates a third embodiment with edges of the barrier layer that form a butt joint and the further layer lying above it.

As illustrated in FIG. 38, the edge of the barrier layer 102 may be formed by having a folded seam with itself. As shown, it can be provided that the middle layer 103 is of the same strength as the double barrier layer 102. However, the middle layer 103 can also be present with a different material thickness.

Figure 39:
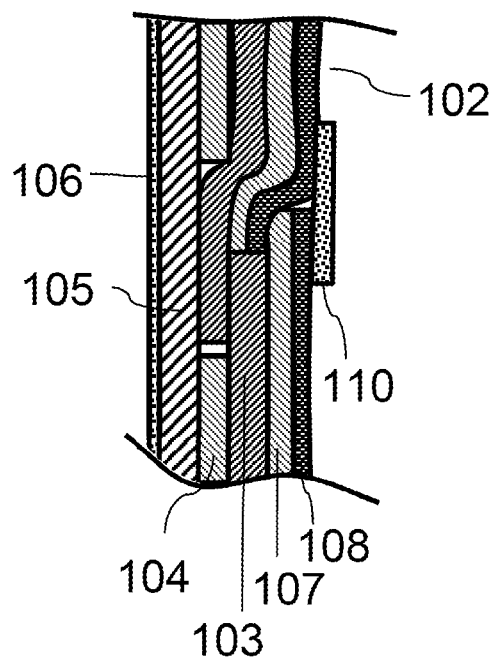
FIG. 39 illustrates a fourth embodiment with edges of the barrier layer that form a butt joint and the further layer lying above it.
Figure 40:
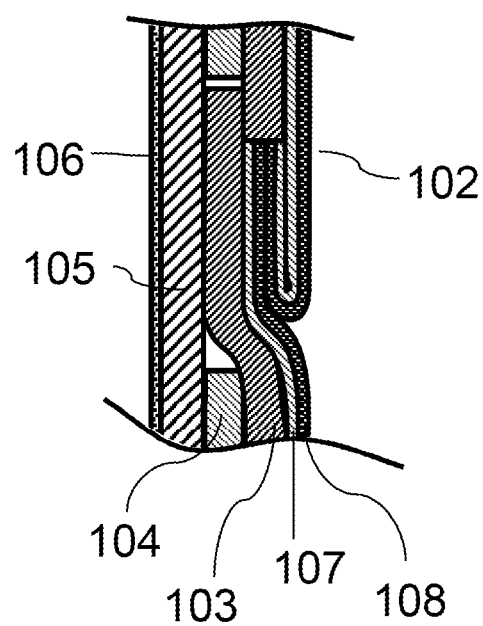
FIG. 40 illustrates a fifth embodiment with edges of the barrier layer that form a butt joint and the further layer lying above it.

As illustrated in FIGS. 39 and 40, the first edge of a second middle layer 104 may abut the outer edge of the first middle layer 103, with the second edge of the second middle layer 104 not extending to the first edge of the second middle layer 104. It is preferred that the second edge of the second middle layer 104 extends to the beginning of the area of the inner middle layer 103, in which the increased thickness of the layer structure is present, which results from the overlap of the barrier layer 102 with itself. As can be seen in FIGS. 39 and 40, the increase in thickness in the area of the overlaps of the barrier layer 102 and the layer 103 present thereon is concealed by the second additional layer 104.

Figure 41:
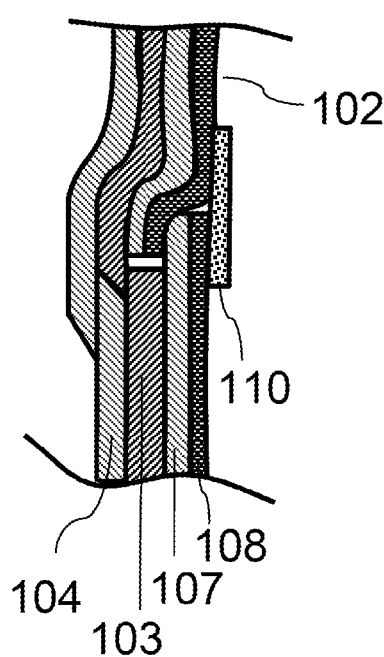
FIG. 41 illustrates a sixth embodiment with edges of the barrier layer that form a butt joint and the further layer lying above it.
Figure 42:
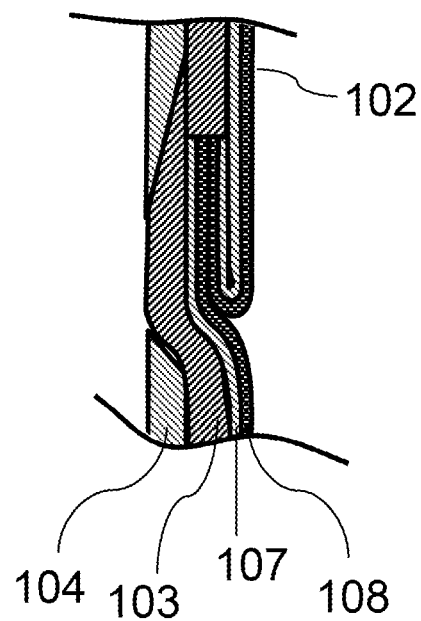
FIG. 42 illustrates a seventh embodiment with edges of the barrier layer that form a butt joint and the further layer lying above it.

As illustrated in FIGS. 41 and 42, the outer edge of the inner middle layer 103 can be designed with a reduced thickness, in particular with an inclined surface. In addition, the edge of the additional middle layer 104 lying on the outside can be designed with a reduced thickness, in particular with an inclined surface. As a result, the edges, in particular inclined surfaces, of the two layers 103, 104 lying one above the other can be present in an overlapping manner. As illustrated in FIGS. 41 and 42, also or alternatively the second edge of the second middle layer 104 can be designed with a reduced thickness, in particular with an inclined surface. As shown in FIG. 41, the further middle layer 104 can overlap itself, whereby the inclined surface of the outer edge can be used to attach an externally adjoining layer, which also has an inclined surface. As shown in FIG. 42, the further layer 104 can serve to conceal the increase in thickness, with the inclined surface being present in the area in which a change in the thickness of the composite of barrier layer 102 and the inner middle layer 103 takes place.

In the embodiments of FIGS. 37, 39 and 41, the longitudinal seam can be sealed by a sealing strip 110 as shown. However, unlike shown, the longitudinal seam can also be sealed by a film layer of the barrier layer 102, which simply overlaps the barrier layer 102 in the area of the longitudinal seam, as illustrated in FIGS. 15, 24, 27 and 31.

In the embodiments of FIGS. 36, 38, 40 and 42, the sealing occurs by the folded seam itself, since no cut edge of the paper or kraft paper layer 107 of the barrier layer 102 is exposed to the inside. The folded seam is specified by the fact that the two edge regions of the barrier layer 102 lie against each other with their diffusion-tight barrier laminate 108 or their diffusion-tight film or coating and the two edge regions are folded back onto the barrier layer 102 itself.

Figure 43:
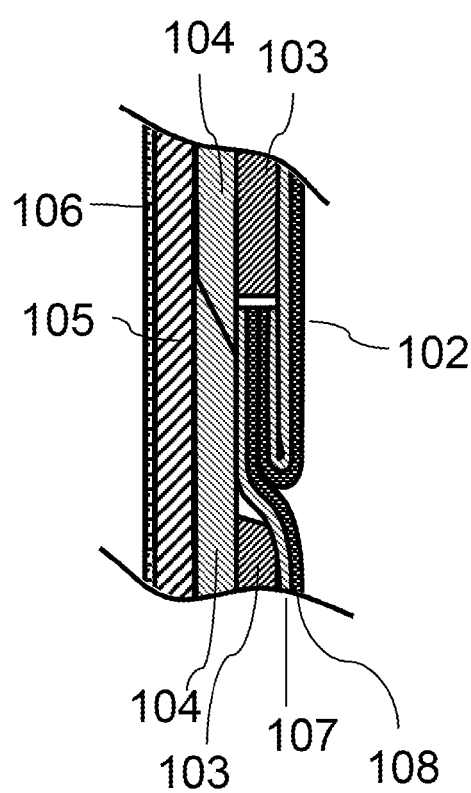
FIG. 43 illustrates a first embodiment with an inclusion of the increase in thickness in the first of the middle layers.
Figure 44:
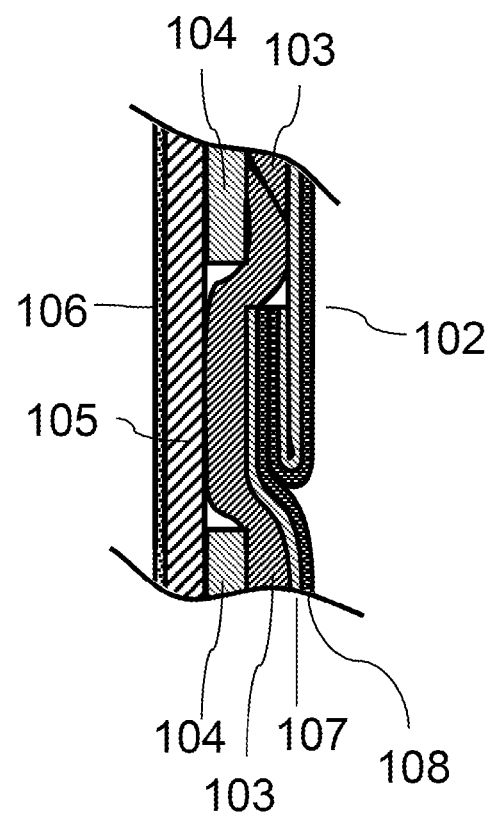
FIG. 44 illustrates a second embodiment with an inclusion of the increase in thickness in the second of the middle layers.

FIGS. 43 and 44 schematically illustrate embodiments in which the increase in thickness of the seam of the barrier layer 102 is at least largely concealed by the further layer structure. In FIGS. 43 and 44, the seam is designed as a self-sealing folded seam, but this can also be designed according to one of the embodiments of the seam of the barrier layer 102 described in the other figures.

In FIG. 43, the seam of the barrier layer 102 is received in a gap in the paper, cardboard or, in particular, kraft paper material of middle layer 103 adjoining the barrier layer 102. The two longitudinal edges of the layer 103 are therefore at a distance from one another and are located on both sides of the increase in thickness of the barrier layer 102 in the area of the seam. In this embodiment, the subsequent further paper or cardboard layer, in particular kraft paper layer 104, preferably runs around the entire circumference of the can shell. The two longitudinal edges of the layer 104 can abut one another or overlap one another, with the overlapping edge regions of the layer 104, can have a reduced thickness, as illustrated in FIG. 43. Contrary to what is shown, it is preferred that the butt joint or overlap area of the layer 104 is arranged offset from the seam of the barrier layer 102 and thus offset from the gap in the layer 103

In the embodiment of FIG. 44, the seam of the barrier layer 102 and the layer 103 adjoining the barrier layer 102 are accommodated in a gap in the subsequent further layer 104 of paper or cardboard, in particular kraft paper. The two longitudinal edges of the layer 104 are at a distance from one another and are located on both sides of the increase in thickness of the barrier layer 102 and the layer 103 in the area of the seam. In this embodiment, layer 103 runs around the entire circumference of the can shell. The two longitudinal edges of the layer 103 can abut one another or overlap one another, with the overlapping edge regions of the layer 103 can have a reduced thickness, as illustrated in FIG. 44. As shown, it is preferred that the butt joint or overlap area of the layer 103 be offset from the seam of the barrier layer 102 and thus offset from the gap of the layer 104.

The embodiment of FIG. 44 has proven to be advantageous over the embodiment of FIG. 43, since in the embodiment of FIG. 44 the layer 103 directly adjoining the barrier layer 102 is self-contained, so that the stability of the can body is greater, particularly in the area of the seam of the barrier layer 102.

Figure 45:
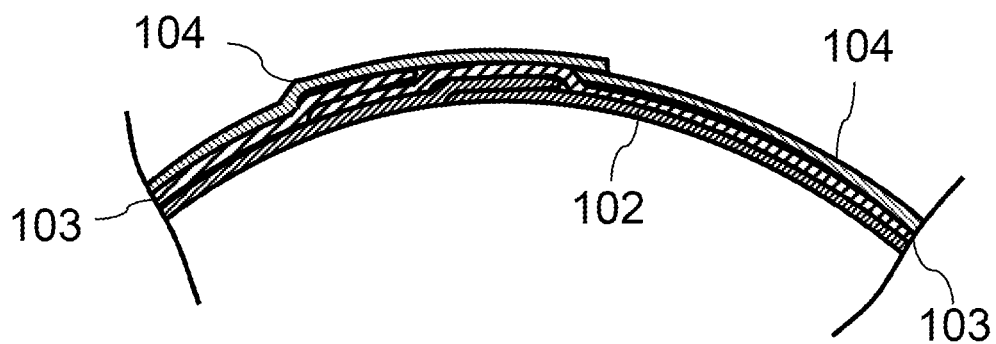
FIG. 45 illustrates a first embodiment with self-overlapping middle layers.

FIG. 45 shows an embodiment in which at least one of the further layers 103, 104 overlaps itself, with the overlapping edge regions of the respective layer 103, 104 not having a reduced thickness. Both layers 103, 104 are preferably designed in this way. The layer 103 and/or the layer 104 thus has an increase in thickness in the form of a simple overlap. The barrier layer 102 can be embodied according to one of the embodiments described herein, in particular having a simple overlap or a folded seam with itself in the seam area. The respective overlaps of the layers 102, 103 and 104 are preferably arranged offset from one another, so that there is no summation of the difference in thickness. The extend of the overlap of the layers 103 and/or 104 can be small, for example in the range of 1 to 10 mm, in particular 1 to 5 mm.

It is preferred that the inner or outer edge of at least one of the respective layers 103, 104 faces an area of the layer structure in which a change in the thickness of the layer structure takes place. As illustrated with layer 103, at least one of the layers 103, 104 can lie with the inner longitudinal edge in front of the increase in thickness of the underlying layer and be placed over the increase in thickness, with the outer longitudinal edge of the layer coming to rest in front of the rising edge of the increase in thickness.

As illustrated with layer 104, at least one of the layers 103, 104 can lie with the inner longitudinal edge after the descending edge of the increase in thickness of the underlying layer and the other end can be guided over the increase in thickness, such that the outer longitudinal edge of the layer overlaps the inner longitudinal edge of the layer.

Figure 46:
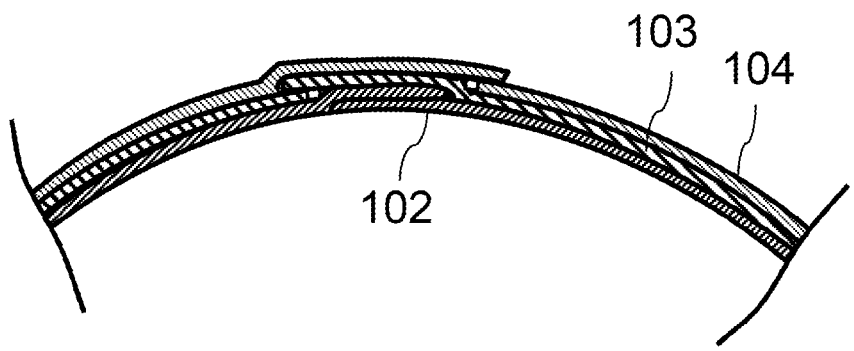
FIG. 46 illustrates a second embodiment with self-overlapping middle layers.

FIG. 46 shows an embodiment in which both further layers 103, 104 overlap themselves. The overlapping edge regions of the respective layer 103, 104 can have a non-reduced thickness. The layers 103 and 104 therefore have an increase in thickness in the form of a simple overlap. The barrier layer 102 can be designed according to one of the embodiments described herein, in particular having a simple overlap or a folded seam with itself in the seam area. The respective overlaps of the layers 102, 103 and 104 are arranged offset to one another, so that there is no summation of the thickness difference.

Both layers 103, 104 lie with the inner longitudinal edge towards a descending flank of the increase in thickness of the layer below and are guided with the other end over the increase in thickness, so that the outer longitudinal edge of the respective layer 103, 104 overlaps the inner longitudinal edge of the respective layer 103, 104.

As illustrated in FIG. 46, the inner longitudinal edges of the layers 103, 104 can face that flank of the increase in thickness which is not formed by a longitudinal edge of the underlying layer. Alternatively, the inner longitudinal edges of the layers 103, 104 can face that flank of the increase in thickness, which is formed by a longitudinal edge of the underlying layer.

There is preferably a small gap between the inner edge of the respective layer 103, 104 and the flank of the increase in thickness, so that the inner edge does not protrude all the way to the flank, ie does not come to rest on or above the flank.

Figure 47:
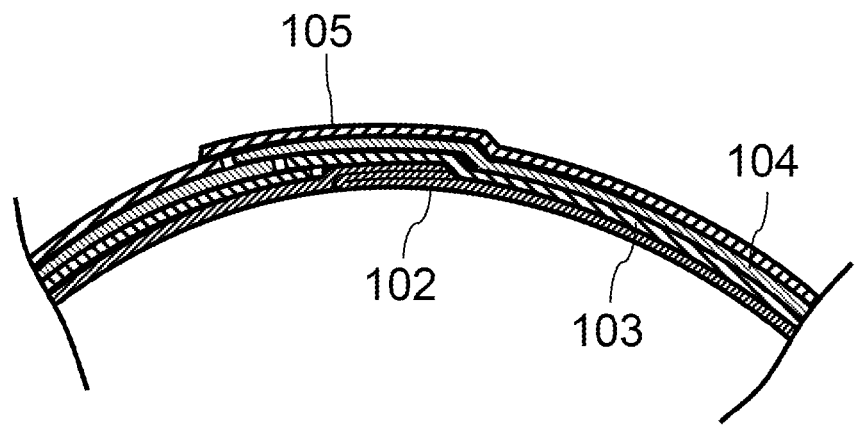
FIG. 47 illustrates a third embodiment with self-overlapping middle layers.

FIG. 47 shows a particularly preferred embodiment in which the two further layers 103, 104 overlap themselves. The overlapping edge regions of the respective layer 103, 104 can have a non-reduced thickness. The layers 103 and 104 therefore have an increase in thickness in the form of a simple overlap. The barrier layer 102 can be designed according to one of the embodiments described herein, in particular having a simple overlap or a folded seam with itself in the seam area. The respective overlaps of the layers 102, 103 and 104 are arranged offset to one another, so that there is no summation of the thickness difference.

Both layers 103, 104 lie with the inner longitudinal edge towards the descending flank of the increase in thickness of the layer below and are guided with the other end over the increase in thickness, so that the outer longitudinal edge of the respective layer 103, 104 overlaps the inner longitudinal edge of the respective layer 103, 104.

As illustrated in FIG. 47, the inner longitudinal edges of the layers 103, 104 can face the same flank of the increase in thickness. As shown in the example, the inner longitudinal edges of the layers 103 and 104 can each be to the left of the increase in thickness. As illustrated in the example, the outer longitudinal edges of the layers 103 and 104 are also in each case on the same side of the increase in thickness, namely on that side on which the inner longitudinal edges of the layers 103, 104 are also present.

There is preferably a small gap between the inner edge of the respective layer 103, 104 and the flank of the increase in thickness, so that the inner edge does not protrude all the way to the flank, ie does not come to rest on or above the flank.

Additional layers are preferably arranged in the same manner as illustrated in FIG. 47 for the outer paper or kraft paper layer 105. The layer 105 lies with its inner longitudinal edge facing the outer longitudinal edge of the layer 104, which forms the rising edge of the increase in thickness.

Basically, it should be noted that in the variant of FIG. 47 and also in the other variants, the number of layers 103, 104, which are located between the barrier layer 102 and the outer paper or kraft paper layer 105, can be greater than 2. There are preferably one to five middle layers 103, 104 made of paper or kraft paper between the barrier layer 102 and the outer paper or kraft paper layer 105, in particular two to three middle layers 103, 104.

There are preferably two to six middle layers 103, 104 made of paper or kraft paper between the barrier layer 102 and the outer barrier layer 106, in particular three to four middle layers 103, 104.

For each of the middle layers 103, 104, it is preferred that the inner or outer longitudinal edge of this layer of the can shell in the form of a wound layer of paper or cardboard material faces a flank of the increase in thickness resulting from the longitudinal seam of the barrier layer.

For at least one, preferably 2, 3 or 4 of the middle layers 103, 104 and optionally layer 105, it is provided in embodiments that the inner longitudinal edge of at least one of the further layers 103, 104 and optionally the layer 105 of the can shell 101 is facing a flank of the increase in thickness that is caused by the longitudinal seam and that the outer longitudinal edge of the respective layer 103, 104, 105 overlaps the inner longitudinal edge of the same layer 103, 104, 105. For all layers designed in this way, it is preferred that the overlap area of the two longitudinal areas of the respective layers is twice the material thickness of the layer and the overlap areas are arranged offset from one another in the circumferential direction. As illustrated in FIG. 47, the overlap areas are preferably arranged adjacent to one another, with the first overlap area of the innermost of these layers adjoining a flank of the increase in thickness of the barrier layer 102 and the further overlap areas of the other layers each adjoining the outer longitudinal edge of the underlying layers.

In the overlap area, the respective middle layer 103, 104 and optionally layer 105 is preferably adhered, in particular glued, to itself.

Figure 48:
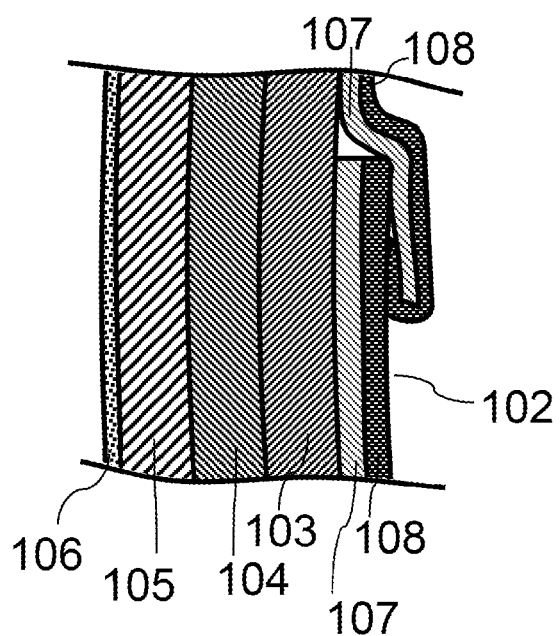
FIG. 48 illustrates an embodiment with a U-shaped seal of the barrier layer.
Figure 49:
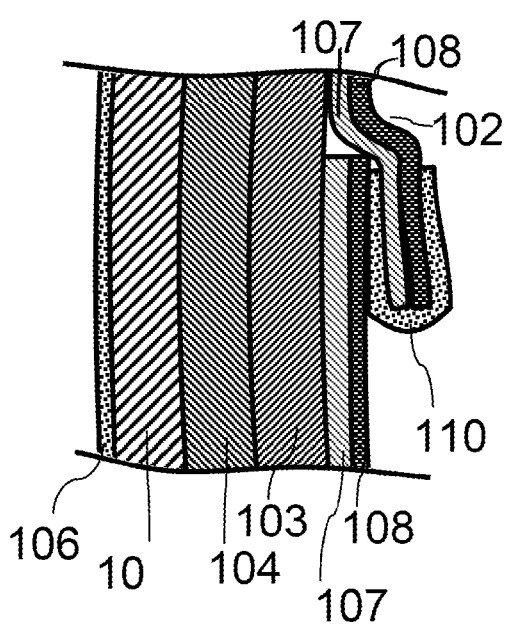
FIG. 49 illustrates an embodiment with a U-shaped seal of the barrier layer.

FIGS. 48 and 49 illustrate embodiments in which a sealing material surrounds the inner longitudinal edge of the whole barrier layer 102 or the inner longitudinal edge of the paper, in particular kraft paper, layer 107, so that sealing material is present on both sides of the inner edge region of the inner paper, in particular kraft paper, layer 107. The web material of the barrier layer 102 is preferably already present in this way before winding or when being fed to the winding device. Alternatively, it is possible to wrap the sealing material around the edge of the web material during feeding to the mandrel of the winding device.

FIG. 48 illustrates that the barrier laminate 108 or a barrier film of the barrier layer 102 can be designed to enclose the inner longitudinal edge of the paper, in particular kraft paper, layer 107. During winding, the outer edge region of the barrier layer 102 comes to lie above the folded-back edge region of the barrier laminate 108 or the barrier film which projects beyond the longitudinal edge of the paper, in particular kraft paper layer 107.

FIG. 49 illustrates that a sealing strip 110 can be present, which encloses the inner longitudinal edge of the barrier layer 102 and thus also the inner longitudinal edge of the paper, in particular kraft paper, layer 107 in a U-shape. During winding, the outer edge region of the barrier layer 102 comes to lie above the folded-back edge region of the sealing strip 110 which projects beyond the longitudinal edge of the paper, in particular kraft paper layer 107. Instead of the sealing strip 110, a coating with a sealing material could also be applied in a U-shape around the inner longitudinal edge of the barrier layer 102 in the same way. The coating can be applied in liquid or gaseous form or as plasma before or during feeding of the material web of the barrier layer 102 to the mandrel of the winding machine. On the inside of the can shell the sealing strip 110 or the coating covers the edge region of the barrier laminate 108 or the barrier film.

In further embodiments, in a modification of the embodiments of FIGS. 41, 39, 37, 34, 28, 21, 18, instead of or in addition to the sealing strip 110, there is a coating applied to the already wound endless tube or preferably to the individual can shells that have already been cut from the endless tube, wherein the coating is made with a sealing material that forms the seam of the barrier layer. Similar to the sealing strip 110, the coating can be applied as a band-shaped application only around the area of the inner longitudinal edge of the barrier laminate 108. Optionally, the coating can also be applied to the cut edges of the can shell and/or as a band-shaped application over the seam of the outermost layer of the can shell.

In another embodiment, the coating is applied to the entire inside of the can shell. Optionally in addition, the coating can be applied to the cut edges of the can shell and/or its entire outside. An additional coating of the can shell that is cut from the endless tube of the winding machine can be carried out in all embodiments described herein.

The invention claimed is:

1. A can, configured to contain at least one of a solid, liquid, and a gaseous medium which can have positive pressure or can develop such during transport or storage, a cylindrical can shell of the can consisting mainly of paper or cardboard material, the cylindrical can shell comprising:
   at least two wound layers and being closed at a bottom with a bottom element and at the top a top with a cover element;
   wherein an innermost layer of the can shell consists of a straight-wound barrier layer which has a longitudinal seam with itself running in the longitudinal direction of the can;
   wherein one of:
      the longitudinal seam is sealed on an inside by a film layer of the barrier layer, which overlaps the barrier layer in an area of the longitudinal seam;
      the longitudinal seam is sealed by a sealing strip running straight in the longitudinal direction of the can; and
      the longitudinal seam is designed as a folded seam and an inner longitudinal edge or an outer longitudinal edge of a further layer of the can shell in a form of a wound layer made of paper or cardboard material faces a flank of an increase in thickness resulting from the folded seam;
   wherein the longitudinal seam of the barrier layer running in the longitudinal direction of the can has an increase in thickness;
   wherein the barrier layer is followed by two subsequent layers of the can shell, in a form of wound layers of paper or cardboard material;
   wherein both subsequent layers of the can shell each overlap themselves and are present in an area of overlap with themselves without a reduction in thickness, the inner longitudinal edge of the respective layer is facing a flank of the increase in thickness; and
   wherein a third subsequent layer is located around the second subsequent layer.

2. The can according to claim 1, wherein:
   the barrier layer is a laminate made of an internal diffusion-tight film or an internal diffusion-tight barrier laminate and an external cardboard or paper or kraft paper layer; and
   the barrier layer has a first edge region which overlaps a second edge region of the barrier layer in the area of the longitudinal seam.

3. The can according to claim 2, wherein in the first edge region the barrier layer comprises the internal diffusion-tight film or an internal diffusion-tight barrier laminate and the external cardboard or paper or kraft paper layer and the inner edge of the first edge region is sealed by a sealing strip.

4. The can according to claim 2, wherein:
   in the first edge region or at least in the outer area of the first edge region the barrier layer comprises only the inner diffusion-tight film or the inner diffusion-tight barrier laminate; and
   the inner diffusion-tight film or the inner diffusion-tight barrier laminate of the first edge region rests on the inner diffusion-tight film or on the inner diffusion-tight barrier laminate of the second edge region.

5. The can according to claim 1, wherein the barrier layer is a laminate made of an inner diffusion-tight film or an inner diffusion-tight barrier laminate and an external cardboard or paper or kraft paper layer, whereby of the can shell comprises at least one further wound layer made of paper or cardboard material, the cardboard or paper surface of the barrier layer and an inner surface of the further wound layer being directly adhered to each other.

6. The can according to claim 1, wherein:
   the barrier layer is a prefabricated laminate made of an internal diffusion-tight barrier laminate and an external kraft paper layer, the barrier layer having a layer thickness of 0.098 mm to 0.145 mm; and
   the kraft paper layer of the barrier layer has a layer thickness of 0.065 mm to 0.090 mm and the diffusion-tight barrier film or the diffusion-tight barrier laminate has a layer thickness of 0.033 mm to 0.055 mm.

7. The can according to claim 1, wherein at least one wound layer made of kraft paper is attached to an outside above the barrier layer, an inner kraft paper surface of the at least one wound layer being adhered to a kraft paper surface of the barrier layer and the outer kraft paper surface of the at least one wound layer being adhered to the cardboard, paper or kraft paper surface of a further wound layer made of paper or cardboard material.

8. The can according to claim 1, wherein:
   the barrier layer itself consists of one or more film layers and has no cardboard or paper or kraft paper layer; and
   the barrier layer overlaps itself in the area of the longitudinal seam.

9. The can according to claim 1, wherein the barrier layer is a laminate made of an internal diffusion-tight film or an internal diffusion-tight barrier laminate and an external cardboard or paper or kraft paper layer, the two edges of the barrier layer meet to form a butt joint in the area of the longitudinal seam and the abutment area is sealed by a sealing strip.

10. The can according to claim 1, wherein:
    the barrier layer is a laminate made of an internal diffusion-tight film or an internal diffusion-tight barrier laminate and an external cardboard or paper or kraft paper layer; and
    at the inner cutting edge of the barrier layer either the diffusion-tight film or at least one film layer of the barrier laminate is placed in a U-shape around the kraft paper layer or a sealing strip is placed in a U-shape around the inner cutting edge of the barrier layer.

11. The can according to claim 1, wherein the medium is a carbonated drink.

12. A can, containing at least one of a solid, liquid, and a gaseous medium which can have excess pressure or can develop such during transport or storage, a cylindrical can shell of the can consisting mainly of paper or cardboard material, wherein the can shell has a barrier layer on an inside and a barrier layer on the outside, the can comprising:
    at least two wound middle layers made of paper or cardboard material in between;
    a bottom element closing the can at the bottom; and a cover element closing the can at the top;
wherein an innermost layer of the can shell consists of a straight-wound barrier layer, which has a longitudinal seam with itself running in a longitudinal direction of the can, the longitudinal seam forming an increase in thickness in the layer structure and an inner longitudinal edge or an outer longitudinal edge of at least one of the middle layers is facing a flank of the increase in thickness resulting from the longitudinal seam;
wherein the barrier layer is followed by said two wound middle layers of the can shell;
wherein both middle layers of the can shell each overlap themselves and are present in an area of overlap with themselves without a reduction in thickness, the inner longitudinal edge of the respective middle layer is facing a flank of the increase in thickness;
wherein a third subsequent layer is located around said two wound middle layers; and
wherein the third subsequent layer is a third wound middle layer or said barrier layer on the outside.

13. The can according to claim 12, wherein said barrier layer on the outside of the can shell is in the form of a tubular sleeve made of moisture-proof material, the tubular sleeve also covering the two cut edges of the can shell.

14. The can according to claim 13, wherein the tubular sleeve overlaps the longitudinally wound barrier layer of the can shell.

15. A method for producing a can, comprising:
manufacturing, in a first step, can shells with a continuously operating winding machine in that the individual layers are applied on a winding mandrel and are continuously connected to one another, wherein during winding the barrier layer is provided with a longitudinal seam running in a longitudinal direction, wherein the longitudinal seam of the barrier layer running in the longitudinal direction of the can has an increase in thickness, wherein the barrier layer is followed by two subsequent layers of the can shell, in a form of wound layers of paper or cardboard material, wherein both subsequent layers of the can shell each overlap themselves and are present in an area of overlap with themselves without a reduction in thickness, the inner longitudinal edge of the respective layer facing a flank of the increase in thickness, wherein a third subsequent layer is located around the second subsequent layer, and wherein subsequently the resulting tube is cut into individual cylindrical hollow bodies open on both sides;
bending outwards, in a second step, the two open ends of the cylindrical hollow body so that the ends have a circular cross section with a larger diameter than the remaining cylindrical hollow body;
closing, in a third step, the lower end of the cylindrical hollow body with a flanging device with a bottom element;
filling, in a fourth step, the hollow body closed at a bottom with the medium using a filling device; and
further closing, in a fifth step, the filled hollow body at the bottom at the top with a cover element using a crimping device;
wherein the fourth and fifth steps are performed on a filling system configured to fill and close known aluminum cans.

16. The method according to claim 15, wherein before or after the second step, a tubular sleeve is placed on an outside over the cylindrical hollow body, the tubular sleeve projecting beyond the cylindrical hollow body on both sides and being folded over into the interior of the cylindrical hollow body.

17. The method according to claim 16, wherein the tubular sleeve is glued or welded to the barrier layer.

* * * * *